(12) United States Patent
Klikic et al.

(10) Patent No.: US 8,116,105 B2
(45) Date of Patent: Feb. 14, 2012

(54) SYSTEMS AND METHODS FOR UNINTERRUPTIBLE POWER SUPPLY CONTROL

(75) Inventors: Damir Klikic, Waltham, MA (US); Pyboyina Msvvsv Prasad, Bangalore (IN); Rajesh Ghosh, Bangalore (IN); Mahima Agrawal, Bangalore (IN)

(73) Assignee: American Power Conversion Corporation, West Kingston, RI (US)

( * ) Notice: Subject to any disclaimer, the term of this patent is extended or adjusted under 35 U.S.C. 154(b) by 553 days.

(21) Appl. No.: 12/027,490

(22) Filed: Feb. 7, 2008

(65) Prior Publication Data

US 2009/0201703 A1 Aug. 13, 2009

(51) Int. Cl.
*H02M 7/22* (2006.01)
*H02M 7/757* (2006.01)
*H02M 7/758* (2006.01)
*H02M 7/797* (2006.01)
*H02M 7/81* (2006.01)

(52) U.S. Cl. ............... 363/41; 363/98; 363/132

(58) Field of Classification Search .......... 363/34, 363/35, 37, 40, 41, 95, 97, 131, 98, 132; 323/207; 307/44, 45, 46, 48, 64, 66

See application file for complete search history.

(56) References Cited

U.S. PATENT DOCUMENTS

| | | | |
|---|---|---|---|
| 4,065,711 A | 12/1977 | Kawabata | |
| 4,272,717 A | 6/1981 | Bailey | |
| 4,564,767 A | 1/1986 | Charych | |
| 4,621,313 A | 11/1986 | Kiteley | |
| 4,648,015 A | 3/1987 | Davis et al. | |
| 4,673,825 A | 6/1987 | Raddi et al. | |
| 4,673,826 A | 6/1987 | Masson | |
| 4,683,529 A | 7/1987 | Bucher, II | |
| 4,735,060 A | 4/1988 | Alsenz | |
| 4,763,013 A | 8/1988 | Gvoth, Jr. et al. | |
| 4,782,241 A | 11/1988 | Baker et al. | |
| 4,816,982 A | 3/1989 | Severinsky | |
| 4,823,247 A | 4/1989 | Tamoto | |
| 4,827,151 A | 5/1989 | Okado | |
| 4,831,508 A | 5/1989 | Hunter | |

(Continued)

FOREIGN PATENT DOCUMENTS

EP 1 187 298 A2 3/2002

(Continued)

OTHER PUBLICATIONS

"Uninterruptible Power Supply Multiloop Control Employing Digital Predictive Voltage and Current Regulators", S. Buso et al., IEEE Transactions of Industry Applications, vol. 37, No. 6, pp. 1846-1854, Nov.-Dec. 2001.

(Continued)

*Primary Examiner* — Gary L Laxton
*Assistant Examiner* — Nusrat Quddus
(74) *Attorney, Agent, or Firm* — Lando & Anastasi, LLP

(57) ABSTRACT

Systems and methods are provided for distributing power to a load by controlling an uninterruptible power supply that has an inverter and a filter, where the filter has an inductor and a capacitor. The systems and methods apply a pulse width modulation control signal to the inverter, sample inverter inductor current and compare the inductor current to a reference current. A duty cycle of the pulse width modulation control signal is adjusted to drive the inductor current at a second sampling time to a value substantially equal to a reference current at a first sampling time. The systems and methods can filter harmonic distortion from output signals and control uninterruptible power supply output.

56 Claims, 21 Drawing Sheets

U.S. PATENT DOCUMENTS

| | | | |
|---|---|---|---|
| 4,860,185 A | 8/1989 | Brewer et al. | |
| 4,935,861 A | 6/1990 | Johnson, Jr. et al. | |
| 4,943,902 A | 7/1990 | Severinsky | |
| 4,949,234 A | 8/1990 | Gulczynski | |
| 4,964,029 A | 10/1990 | Severinsky et al. | |
| 4,980,812 A | 12/1990 | Johnson, Jr. et al. | |
| 5,017,800 A | 5/1991 | Divan | |
| 5,019,717 A | 5/1991 | McCurry et al. | |
| 5,045,989 A | 9/1991 | Higaki et al. | |
| 5,047,913 A | 9/1991 | De Doncker et al. | |
| 5,099,410 A | 3/1992 | Divan | |
| 5,111,374 A | 5/1992 | Lai et al. | |
| 5,126,585 A | 6/1992 | Boys | |
| 5,142,163 A | 8/1992 | Hase | |
| 5,148,043 A | 9/1992 | Hirata et al. | |
| 5,184,025 A | 2/1993 | McCurry et al. | |
| 5,198,698 A | 3/1993 | Paul et al. | |
| 5,241,217 A | 8/1993 | Severinsky | |
| 5,264,732 A | 11/1993 | Fiorina et al. | |
| 5,289,046 A | 2/1994 | Gregorich et al. | |
| 5,291,383 A | 3/1994 | Oughton | |
| 5,302,858 A | 4/1994 | Folts | |
| 5,311,419 A | 5/1994 | Shires | |
| 5,315,533 A | 5/1994 | Stich et al. | |
| 5,371,666 A | 12/1994 | Miller | |
| 5,422,558 A | 6/1995 | Stewart | |
| 5,458,991 A | 10/1995 | Severinsky | |
| 5,465,011 A | 11/1995 | Miller et al. | |
| 5,481,730 A | 1/1996 | Brown et al. | |
| 5,532,523 A | 7/1996 | Tang | |
| 5,541,490 A | 7/1996 | Sengupta et al. | |
| 5,541,828 A | 7/1996 | Rozman | |
| 5,559,685 A | 9/1996 | Lauw et al. | |
| 5,581,450 A | 12/1996 | Walne | |
| 5,616,968 A | 4/1997 | Fujii et al. | |
| 5,629,604 A | 5/1997 | Sengupta et al. | |
| 5,684,686 A | 11/1997 | Reddy | |
| 5,684,688 A | 11/1997 | Rouaud et al. | |
| 5,686,768 A | 11/1997 | Thomsen et al. | |
| 5,796,223 A | 8/1998 | Ohtsuka et al. | |
| 5,844,328 A | 12/1998 | Furst | |
| 5,969,436 A | 10/1999 | Chalasani et al. | |
| 5,982,652 A | 11/1999 | Simonelli et al. | |
| 5,998,886 A | 12/1999 | Hoshino et al. | |
| 6,169,669 B1 | 1/2001 | Choudhury | |
| 6,184,593 B1 | 2/2001 | Jungreis | |
| 6,201,319 B1 | 3/2001 | Simonelli et al. | |
| 6,274,950 B1 | 8/2001 | Gottlieb et al. | |
| 6,282,111 B1 * | 8/2001 | Illingworth | 363/98 |
| 6,381,156 B1 | 4/2002 | Sakai et al. | |
| 6,424,119 B1 | 7/2002 | Nelson et al. | |
| 6,483,730 B2 | 11/2002 | Johnson, Jr. | |
| 6,493,243 B1 | 12/2002 | Real | |
| 6,629,247 B1 | 9/2003 | Hall et al. | |
| 6,728,119 B2 | 4/2004 | Reilly et al. | |
| 6,784,641 B2 | 8/2004 | Sakai et al. | |
| 6,791,850 B2 * | 9/2004 | Pai et al. | 363/37 |
| 6,803,678 B2 | 10/2004 | Gottlieb et al. | |
| 6,838,925 B1 | 1/2005 | Nielsen | |
| 6,862,199 B2 | 3/2005 | Escobar et al. | |
| 6,906,933 B2 | 6/2005 | Taimela | |
| 6,940,187 B2 | 9/2005 | Escobar et al. | |
| 6,949,843 B2 | 9/2005 | Dubovsky | |
| 6,958,550 B2 | 10/2005 | Gilbreth et al. | |
| 6,983,212 B2 | 1/2006 | Burns | |
| 7,005,759 B2 | 2/2006 | Ying et al. | |
| 7,012,825 B2 | 3/2006 | Nielsen | |
| 7,126,409 B2 | 10/2006 | Nielsen | |
| 7,233,113 B2 | 6/2007 | Ongaro et al. | |
| 7,274,112 B2 | 9/2007 | Hjort et al. | |
| 7,301,790 B2 * | 11/2007 | Li et al. | 363/132 |
| 2001/0003206 A1 | 6/2001 | Pole et al. | |
| 2001/0033502 A1 | 10/2001 | Blair et al. | |
| 2002/0044469 A1 | 4/2002 | Yasumura | |
| 2002/0126518 A1 | 9/2002 | Lazarovich | |
| 2002/0191425 A1 | 12/2002 | Geissler | |
| 2003/0033550 A1 | 2/2003 | Kuiawa et al. | |
| 2003/0048005 A1 | 3/2003 | Goldin et al. | |
| 2003/0048006 A1 * | 3/2003 | Shelter, Jr. et al. | 307/64 |
| 2003/0090225 A1 | 5/2003 | Posma et al. | |
| 2003/0099371 A1 | 5/2003 | Ogura et al. | |
| 2003/0111842 A1 | 6/2003 | Gilbreth et al. | |
| 2003/0184160 A1 | 10/2003 | Yamamoto | |
| 2003/0220026 A1 | 11/2003 | Oki et al. | |
| 2004/0155526 A1 | 8/2004 | Naden et al. | |
| 2005/0036248 A1 | 2/2005 | Klikic et al. | |
| 2005/0162019 A1 | 7/2005 | Masciarelli et al. | |
| 2005/0162129 A1 | 7/2005 | Mutabdzija et al. | |
| 2005/0162836 A1 | 7/2005 | Briggs et al. | |
| 2006/0043792 A1 * | 3/2006 | Hjort et al. | 307/1 |
| 2006/0043793 A1 | 3/2006 | Hjort et al. | |
| 2006/0043797 A1 | 3/2006 | Hjort et al. | |
| 2006/0044846 A1 | 3/2006 | Hjort et al. | |
| 2006/0279970 A1 | 12/2006 | Kernahan | |
| 2007/0064363 A1 | 3/2007 | Nielsen et al. | |
| 2008/0157601 A1 | 7/2008 | Masciarelli et al. | |
| 2008/0197706 A1 | 8/2008 | Nielsen | |

FOREIGN PATENT DOCUMENTS

| | | |
|---|---|---|
| GB | 2 295 061 A | 5/1996 |
| JP | 11-146575 A | 5/1999 |
| JP | 2004-120587 | 4/2004 |
| WO | 0249185 A1 | 6/2002 |

OTHER PUBLICATIONS

"Predictive Digital Current Programmed Control", Chen, J. et al., IEEE Transactions on Power Electronics, vol. 18, No. 1, Jan. 2003. http://citeseer.ist.psu.edu/chen03predictive.html.

Abu-Rub et al., "Predictive current control of voltage source inverters," IECON'01: The 27th Annual Conference of the IEEE Industrial Electronics Society, Denver, CO, Nov. 29-Dec. 2, 2001; vol. 2, Nov. 29, 2001, pp. 1195-1200.

Notification of Transmittal of The International Search Report and The Written Opinion of the International Searching Authority from International Application No. PCT/US2009/033164, dated Apr. 24, 2009.

Invitation to Pay Additional Fees with Partial International Search Report for PCT/US2005/030664, mailed Jun. 6, 2006.

Patent Abstracts of Japan, JP 11146575 A (NEC Corp.), May 28, 1999, 1 page.

Patent Abstracts of Japan, JP 2004120857 A (Matsushita Electric Ind. Co. Ltd.), Apr. 15, 2004, 1 page.

International Search Report for PCT/US2005/030664, mailed Nov. 13, 2006.

* cited by examiner

SYSTEMS AND METHODS FOR UNINTERRUPTIBLE POWER SUPPLY CONTROL

BACKGROUND OF THE INVENTION

1. Field of the Invention

Embodiments of the present invention relate generally to uninterruptible power supply voltage and current control. More specifically, at least one embodiment relates to predictive voltage or predictive current control of an uninterruptible power supply inverter.

2. Discussion of the Related Art

Uninterruptible power supplies (UPS) are used to provide reliable power to many different types of electronic equipment. Often, this electronic equipment requires particular voltage and/or current input from a UPS. Unintended fluctuations in UPS power output can damage electrical equipment, which results in a loss of productivity and can require costly repair or replacement of electrical components.

FIG. 1 provides a block diagram of a typical on-line UPS 100 that provides regulated power as well as back-up power to a load 140. UPS's similar to that shown in FIG. 1 are available from American Power Conversion (APC) Corporation of West Kingston, R.I. The UPS 100 includes a rectifier/boost converter 110, an inverter 120, a controller 130 and a battery 150. The UPS has inputs 112 and 114 to couple respectively to line and neutral of an input AC power source and has outputs 116 and 118 to provide an output line and neutral to the load 140.

In line mode of operation, under control of controller 130, the rectifier/boost converter 110 receives the input AC voltage and provides positive and negative output DC voltages at output lines 121 and 122 with respect to a common line 124. In battery mode of operation, upon loss of input AC power, the rectifier/boost converter 110 generates the DC voltages from the battery 150. The common line 124 may be coupled to the input neutral 114 and the output neutral 118 to provide a continuous neutral through the UPS 100. The inverter 120 receives the DC voltages from the rectifier/boost converter 110 and provides an output AC voltage at lines 116 and 118.

Existing schemes for controlling UPS power output utilize proportional-integral type voltage and current controllers, with lead-lag compensators to compensate for computational delay in digital implementations. However, this type of UPS power control is not without its drawbacks, as these control systems are typically of complex and costly design.

SUMMARY OF THE INVENTION

The systems and methods disclosed herein control uninterruptible power supply distribution to a load. To increase efficiency, predictive voltage control and predictive current control regulate UPS output voltage and/or current. This improves reliability and reduces cost. Further, it is desirable to reduce Total Harmonic Distortion output levels. At least one aspect of the invention is directed to a method of distributing power to a load using an uninterruptible power supply. The uninterruptible power supply includes an output inverter and a filter, and the filter includes an inductor and a capacitor. A pulse width modulation control signal is applied to the output inverter, and inductor current is periodically sampled at a first sampling time and at a second sampling time. The inductor current at the first sampling time is compared with a reference current at the first sampling time, and a duty cycle of the pulse width modulation control signal is adjusted to drive the inductor current at the second sampling time towards a value that is substantially equal to the reference current at the first sampling time, and an output voltage of the uninterruptible power supply is applied to the load.

At least one other aspect of the invention is directed to an uninterruptible power supply. The uninterruptible power supply includes an output inverter and a filter, and the filter includes an inductor and a capacitor. The uninterruptible power supply includes a processor that is configured to apply a pulse width modulation control signal to the output inverter and to periodically sample inductor current at a first sampling time and a second sampling time. The processor is further configured to compare the inductor current at the first sampling time with a reference current at the first sampling time. The duty cycle of the pulse width modulation control signal is adjusted to drive the inductor current at the second sampling time towards a value that is substantially equal the reference current at the first sampling time, and the uninterruptible power supply applies an output voltage to the load.

In at least one other aspect of the invention an uninterruptible power supply includes an input module that is configured to receive a pulse width modulation control signal. The uninterruptible power supply includes a control module having an output inverter and a filter and an output module coupled to both the input module and to the pulse width modulation control signal to provide output power to a load in response to the pulse width modulation control signal. The uninterruptible power supply includes means for adjusting a duty cycle of the pulse width modulation control signal to drive current through the inductor towards a value substantially equal to a reference current value in a time period that is less than or equal to a switching cycle time period of a carrier signal associated with the pulse width modulation control signal.

Various embodiments of these aspects may include sampling a voltage across the capacitor at the first sampling time and obtaining the reference current at the first sampling time based at least in part on the capacitor voltage and on the inductor current at the first sampling time. In an embodiment the reference current at the first sampling time is within 10% of the value of the inductor current at the second sampling time, and an inductor current of the uninterruptible power supply may be supplied to the load. In various embodiments the first sampling time is a time within 10% of a first peak of a carrier signal associated with the pulse width modulation control signal, the second sampling time is a time within 10% of a second peak of the carrier signal. The first and second peaks may be subsequent peaks of the carrier signal, and the adjustment of the duty cycle may begin at a time within 10% of the valley of the carrier signal. In an embodiment the reference current is determined by implementing any combination of predictive voltage control based in part on a voltage of the capacitor and predictive current control based in part on the inductor current. In one embodiment adjusting the duty cycle drives a capacitor voltage at the second sampling time towards a value equal to a reference voltage at the first sampling time. In one embodiment applying the pulse width modulation control signal, periodically sampling inductor current, comparing the inductor current with the reference current, adjusting the duty cycle, and applying the output voltage are performed by a processor and implemented in a program stored in a computer readable medium and executed by the processor. Furthermore in various embodiments harmonic distortion is filtered from the output inverter.

Other aspects and advantages of the systems and methods disclosed herein will become apparent from the following detailed description, taken in conjunction with the accompanying drawings, illustrating the principles of the invention by way of example only.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
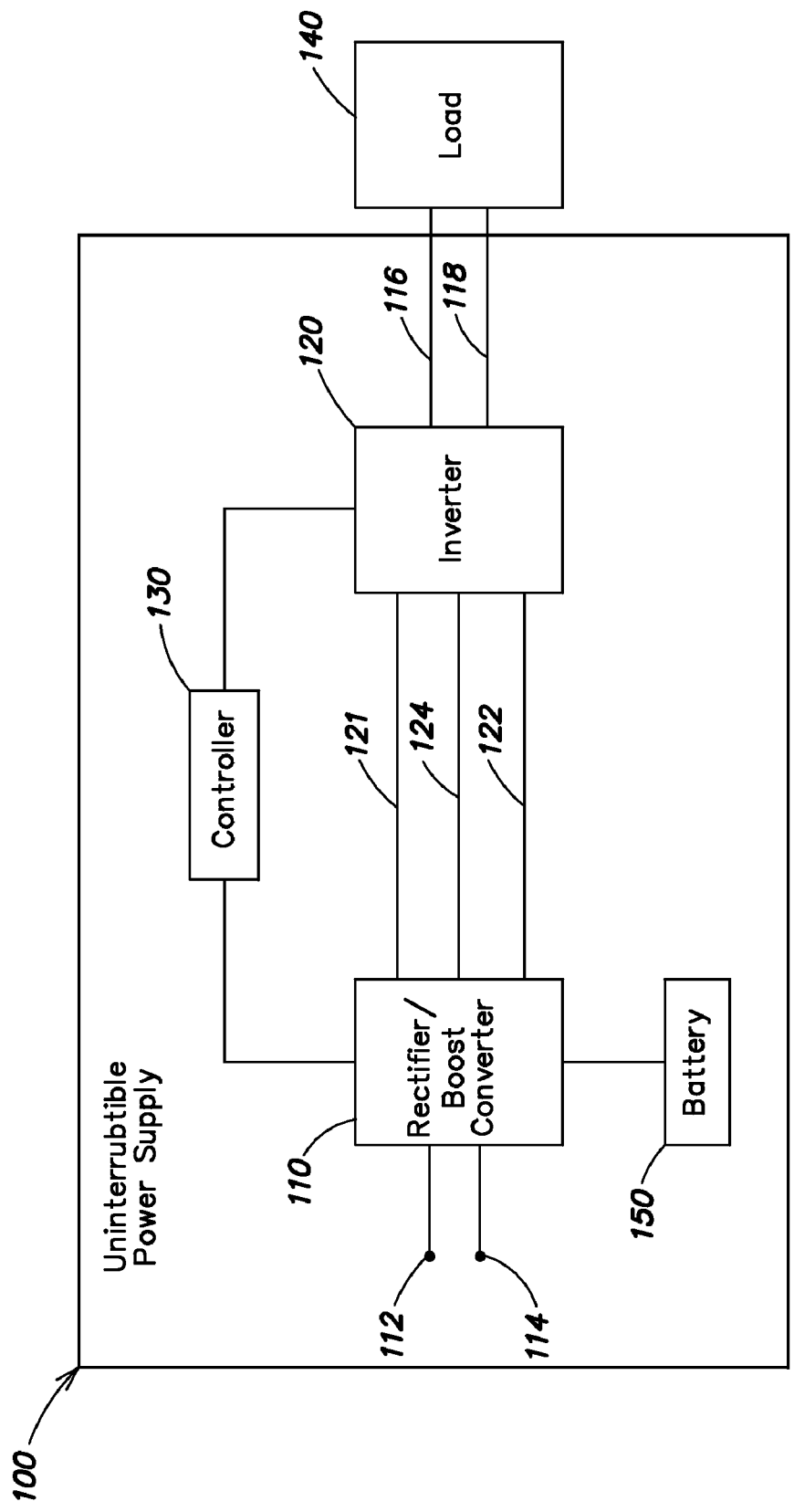
FIG. 1 is a functional block diagram illustrating an uninterruptible power supply in a state of operation.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least one embodiment of the present invention provides improved power distribution to a load in, for example, in the uninterruptible power supply of FIG. 1. However, embodiments of the present invention are not limited for use in uninterruptible power supplies, but may be used with other power supplies or other systems generally.

As shown in the drawings for the purposes of illustration, the invention may be embodied in systems and methods for distributing power to a load using an uninterruptible power supply. These systems and methods can adjust a duty cycle of a pulse width control signal to vary output power, voltage, and/or current. Embodiments of the systems and methods disclosed herein allow for filtering of harmonic distortion.

Figure 2:
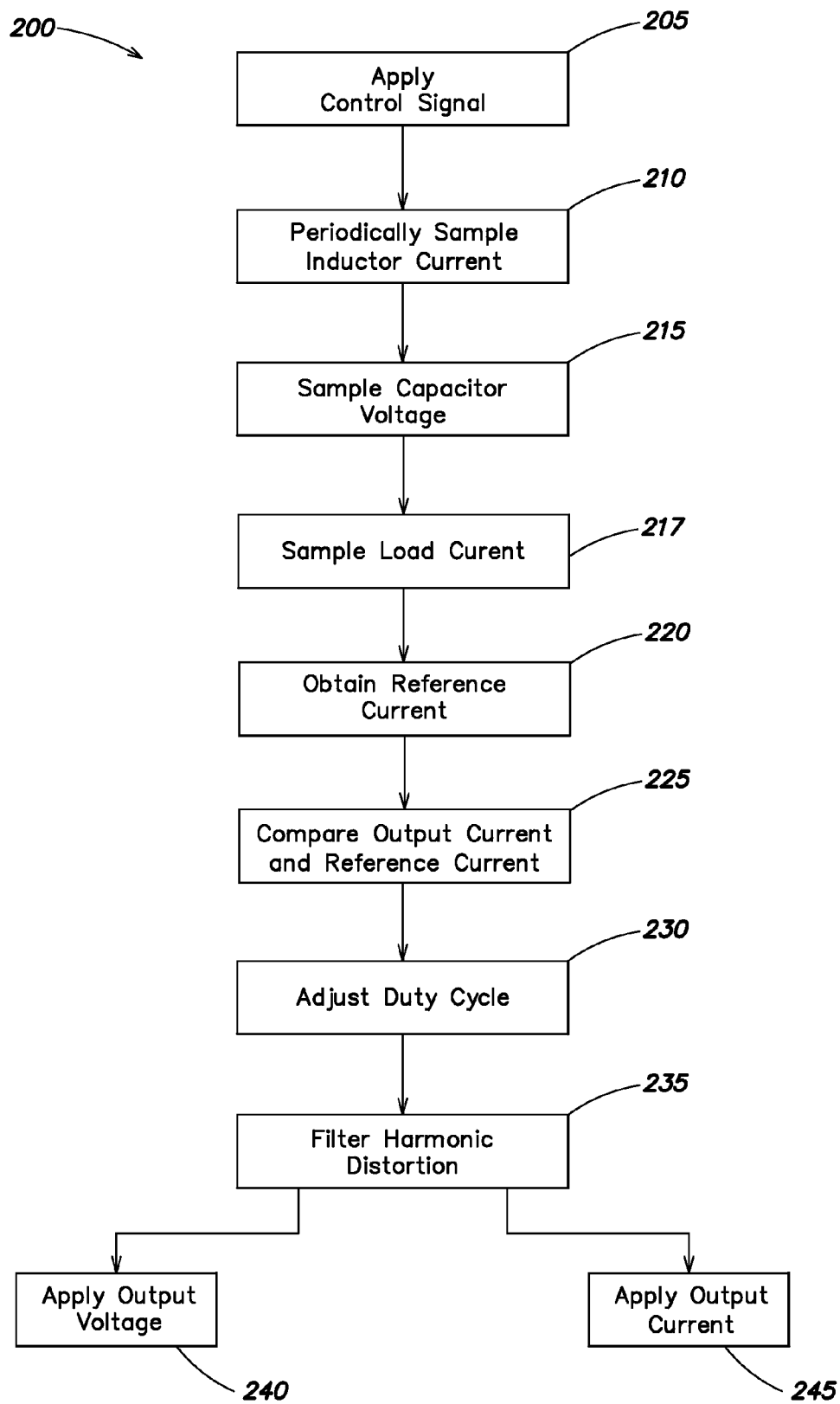
FIG. 2 is a flow chart illustrating a method of distributing power to a load in a state of operation.

In brief overview, FIG. 2 is a flow chart depicting a method 200 of distributing power to a load in accordance with one embodiment of the invention. In a mode of operation method 200 includes an uninterruptible power supply with both an output inverter and a filter, and the filter includes an inductor and a capacitor. In one embodiment method 200 includes the act of applying a control signal to the output inverter (ACT 205). In one embodiment this applying act, (ACT 205) can include a pulse width modulation signal generator that generates a pulse width modulation (PWM) control signal. The control signal such as a PWM control signal can be, for example, a square wave whose duty cycle is modulated resulting in variation of the average value of the waveform. In various embodiments, applying the PWM control signal (ACT 205) includes inputting the control signal to an output inverter. For example, applying the PWM control signal (ACT 205) can include generating or receiving a generated PWM control signal and transmitting the PWM control signal to the output inverter. In this illustrative embodiment the output inverter receives a control signal sufficient to enable output inverter operation.

In one embodiment current flows through the output inverter when a PWM control signal is applied to the output inverter (ACT 205). This inverter output current may be referred to as inductor current, and in this example is input into a filter, such as a low pass filter that includes an inductor and a capacitor. Continuing with this illustrative embodiment method 200 may include the act of periodically sampling inductor current (ACT 210). Periodically sampling inductor current (ACT 210) includes, for example, sampling inductor current at a first sampling time and sampling inductor current at a second sampling time. Periodically sampling inductor current (ACT 210) may include measuring or otherwise receiving an indication of the inductor current of the output inverter during a peak in a carrier signal associated with the PWM control signal at a first sampling time and at a second sampling time. In one embodiment this includes sampling inductor current (ACT 210) at a sampling time that is at, or alternatively, within 10% of a carrier signal peak. It is appreciated, however, that inductor current may be sampled (ACT 210) at any instant of the carrier signal waveform, including times at or near carrier signal peaks, carrier signal valleys, or any instant between subsequent carrier signal peaks.

In one mode of operation method 200 includes the act of sampling a voltage of the capacitor at a first sampling time (ACT 215). The capacitor from which the capacitor voltage is sampled (ACT 215) is typically a capacitor associated with the filter. Sampling a voltage of the capacitor (ACT 215) generally includes taking, obtaining, or receiving a measurement of the voltage across the capacitor at a point in time. In some embodiments, sampling a voltage of the capacitor (ACT 215) can include estimating the value of the capacitor voltage, and sampling the inductor current (ACT 210) can include estimating the value of the inductor current. As with the periodic sampling of the inductor current (ACT 210), sampling capacitance voltage (ACT 215) occurs, in various embodiments, at any instant of the carrier signal, including at or near carrier signal waveform peaks or valleys.

In one embodiment, method 200 can include the act of sampling the load current $I_{Load}$ (ACT 217). Generally, the act of sampling the load current $I_{Load}$ (ACT 217) can occur at any sampling time, and can include taking obtaining or receiving a measurement of load current $I_{Load}$ at any instant of the carrier signal. In some embodiments, sampling the load current $I_{Load}$ can include estimating or extrapolating a value of the $I_{Load}$.

Method 200 may also include the act of obtaining a reference current at the first sampling time (ACT 220). In one embodiment that includes this act, obtaining the reference current (ACT 220) includes obtaining the reference current at the first sampling time based at least in part on the inductor current at the first sampling time and the voltage of the capacitor at the first sampling time. As further discussed herein, the reference current is generally a predictive inductor current at a subsequent sampling time. For example, the reference inductor current ($I_L^*$) may be the predictive inductor current $I_{L(n+1)}$ at the $n^{th}$ sampling time. In other words, having sampled the inductor current at the first sampling time ($I_{L(n)}$) (ACT 210), the reference inductor current may include a determination of the value of the inductor current at the $(n+1)^{th}$ or next sampling time. Given the value of the sampled inductor current at a first sample time (ACT 210) and the slope of inductor current rise or fall within a switching cycle or sampling period, the reference current ($I_L^*$) can be determined relative to a duty ratio $D_n$, where the duty ratio is the ratio between the pulse duration, (e.g. when a PWM control signal is non-zero) and the period of the control signal (e.g. a rectangular wave waveform).

Again as further discussed herein, in one embodiment the capacitance voltage ($v_c$) is sampled (ACT 215) and a reference capacitor current $I_{C(n)}^*$ can be determined based in part on the sampled (ACT 215) capacitance voltage ($v_c$). Because, generally, in a filter such as an LC filter inductor current $I_L = I_{Load} + I_C$, it follows that reference inductor current $I_{L(n)}^* = I_{Load} + I_{C(n)}^*$. In this illustrative example it is seen that the reference current $I_{L(n)}^*$ may be obtained (ACT 220) based at least in part on the inductor current ($I_L$) sampled (ACT 210) at a first sampling time, a capacitance voltage ($v_c$) sampled (ACT 215) at the first sampling time, or a load current $I_{Load}$ sampled (ACT 217) at the first sampling time.

Method 200 in an embodiment includes the act of comparing an inductor current at a first sampling time with a reference current through the inductor at the first sampling time (ACT 225). Comparing the inductor current with the inductor reference current (ACT 225) typically includes determining the difference in these two currents, referred to herein as a current error value. For example, the comparison (ACT 225) may include a logic device that performs a logic or processing operation on the two current values to determine their difference relative to each other. In an illustrative embodiment, in addition to comparing the inductor current at a first sampling time with a reference current at the first sampling time (ACT 225), method 200 includes adjusting a duty cycle of the PWM control signal to drive the inductor current at the second sampling time towards a value that is substantially equal to the reference current at the first sampling time (ACT 230).

In one embodiment adjusting the PWM control signal duty cycle (ACT 230) includes driving the voltage of the capacitor at the second sampling time towards a value substantially equal to a reference voltage of the capacitor at the first sampling time. Generally, adjusting duty cycle (ACT 230) causes inductor current $I_{L(n)}$ to adjust to a value substantially equal to reference inductor current $I_{L(n)}^*$ at a point in time after the first sampling time ($T_{(n)}$) and before the second sampling time ($T_{(N+1)}$). Continuing with this example, at the second sampling time $T_{(N+1)}$ reference inductor current $I_{L(n+1)}^*$ may have a different value than that of reference inductor current $I_{L(n)}^*$ due, for example, to the power requirements of a nonlinear load. However, adjusting the PWM control signal duty cycle (ACT 230) in an embodiment causes inductor current $I_{L(n+1)}$ at a $(n+1)^{th}$ sampling time to substantially equal reference inductor current $I_{L(n)}^*$ at an instant of a $n^{th}$ sampling time. As such, in various embodiments the inductor current or capacitor voltage, or both may be driven toward or follow, respectively, the reference inductor current or the reference capacitor voltage, by one sampling period, i.e., a delay of one switching cycle.

In some embodiments the difference at the $n^{th}$ sampling time between inductor current $I_{L(n)}$ and reference inductor current $I_{L(n)}^*$ can be referred to as current error $e_{I(n)}$. Because in various embodiments many loads operate in a nonlinear fashion with respect to current or power consumption the load current $I_{Load}$ required by the load can change frequently. As a result inductor current $I_L$ typically must be controlled and adjusted to regulate output power sent to a load. In general, when current error $e_{I(n)}$ is zero the load current $I_{Load}$ is at an appropriate value for a load to function. Because, as discussed above, reference inductor current $I_{L(n)}^*$ can be expressed relative to duty cycle $D_n$, the duty cycle $D_n$ of the PWM control signal can be adjusted to drive current error $e_{I(n)}$ towards zero at the $n^{th}$ sampling time, before the $(n+1)^{th}$ sample, (e.g. a sample at a second sampling time) is taken. Changing the duty cycle $D_n$ in this manner generally drives inductor current $I_L$ at the first sampling time to a level substantially equal to the reference inductor current $I_{L(n)}^*$ after the first sampling time and before the second sampling time. Generally, a new current error $e_{I(n)}$ may occur at the second sampling time. However, continuing with this illustrative embodiment, at this second sampling time inductor current $I_{L(n)}$ has been controlled or driven to a value near the level of reference inductor current $I_{L(n)}^*$ at the first sampling time. Thus, and as discussed in further detail herein, adjusting a duty cycle of the PWM control signal (ACT 230) in one embodiment causes inductor current $I_L$ to track reference inductor current $I_L^*$ by one sampling delay.

It is appreciated that in various embodiments the inductor current or capacitor voltage at the second sampling time is not exactly equal to the inductor reference current or capacitor voltage at the first sampling time. In various embodiments these two values may be substantially equal. For example, in one embodiment the inductor current at the second sampling time is driven towards a value within 10% of the reference current at the first sampling time, (i.e. plus or minus 10%). In various other embodiments these values may deviate from each other by more than +/−10% and are still substantially equal as defined herein.

Furthermore, in an embodiment adjusting the duty cycle of the PWM control signal (ACT 230) includes the act of initiating the adjustment of the duty cycle at a point in time within 10% of the valley of the carrier signal. In one embodiment, sampling the inductor current of the filter (ACT 210) initiates at the peak of the carrier signal, and adjusting the duty cycle of the PWM control signal (ACT 230) initiates at the valley of the carrier signal. In this illustrative embodiment the time delay between inductor current sampling (ACT 210) and duty cycle adjusting (ACT 230) is substantially half of the switching cycle, i.e., $T_S/2$. Reducing this time delay to $T_S/2$ reduces computational delay and results in efficient current and voltage control. It is appreciated that in other embodiments this adjustment can initiate within 10% of the peak of the carrier signal or at any other instant of the carrier signal. This instant may generally be referred to as an update instant. In one embodiment, inductor current can be predicted at the instant of adjusting (ACT 230) the control signal.

In some embodiments method 200 includes the act of filtering harmonic distortion from the output inverter (ACT 235). Generally, harmonic distortion includes switching frequency voltage harmonics generated by the inverter, and filtering the harmonic distortion (ACT 235) may include the use of a low-pass filter. Filtering harmonic distortion (ACT 235) typically improves inverter output signals by removing unwanted noise or other interference. In one embodiment, filtering harmonic distortion (ACT 235) includes filtering harmonic distortion levels to a level less than 4.4% of the inverter output. In an alternate embodiment, harmonic distortion is filtered to a level below 8%, and in some embodiments filtering harmonic distortion (ACT 235) may include filtering inverter output from a signal so that harmonic distortion constitutes less then 3% of the inverter output. In one embodiment, extrapolating the load current $I_{Load}$ at an update instant can reduce total harmonic distortion levels to less than or equal to 3.4% of inverter output.

In one operational state method 200 includes the act of applying an output voltage of the uninterruptible power supply to the load (ACT 240). In one embodiment this includes the inverter output voltage, and in another embodiment this includes the inverter output voltage after filtering harmonic distortion (ACT 235) from the voltage signal. Applying the output voltage to the load (ACT 240) generally includes outputting or transmitting the uninterruptible power supply output voltage to any load, where the load receives this voltage as input. In one embodiment applying the output voltage to the load (ACT 240) includes applying the output voltage to a diode bridge rectifier, or any other rectifier circuit that may be included as part of the load. In one embodiment applying the output voltage (ACT 240) includes making the output voltage available to a load whether or not the load is actually present.

Method 200 also includes in one embodiment the act of applying an output current of the uninterruptible power supply to the load (ACT 245). Applying the output current (ACT 245) may but need not include applying the output current of a filter, such as a LC filter, to the load. In various embodiments applying the output current to the load (ACT 245) includes passing the output current through a diode bridge or other rectifier circuit. In one embodiment applying the output current (ACT 245) includes making the output current available to a load whether or not the load is actually present.

Figure 3:
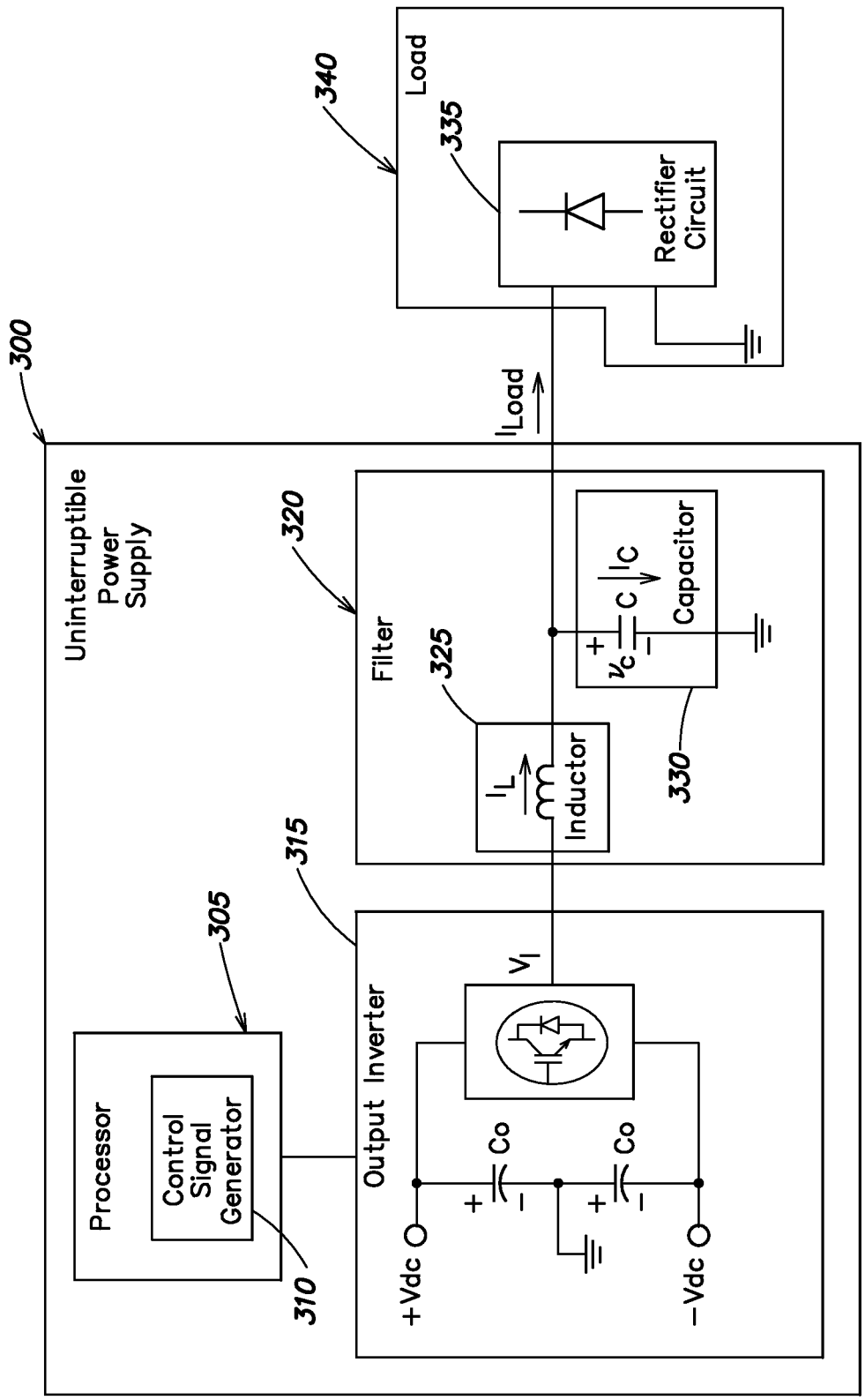
FIG. 3 is a functional block diagram illustrating an uninterruptible power supply in a state of operation.

In brief overview, FIG. 3 is a functional block diagram of an uninterruptible power supply 300 in accordance with an embodiment of the invention. Uninterruptible power supply (UPS) 300 generally includes a device that maintains a continuous or nearly continuous supply of electric power to various loads. UPS 300 may be of the on-line or off-line variety. Embodiments of the present invention are not limited for use in uninterruptible power supplies, but may be used with other power supplies or other systems generally.

In one embodiment UPS 300 includes at least one processor 305. Processor 305 may include any device with sufficient processing power to perform the logic operations disclosed herein. Processor 305 may but need not be integrated into UPS 300. For example, processor 305 can be physically contained within UPS 300, or alternatively processor 305 may be remote to but associated with UPS 300. In one embodiment there can be a plurality of processors 305, which may be located within a housing of UPS 300, outside UPS 300, or some processors 305 may be inside UPS 300 with other processors 305 situated outside UPS 300. Processor 305 may include any of an input module, a control module, or an output module.

Processor 305 in one embodiment includes at least one control signal generator 310. Control signal generator 310 may be integral to or associated with processor 305, and in one embodiment control signal generator 310 includes at least one carrier signal. Generally, control signal generator 310 is a device capable of creating, forming, or otherwise outputting a control signal such as a pulse width modulation (PWM) control signal. In various embodiments, control signal generator 310 or any of processors 305 can adjust a duty cycle of a PWM control signal to drive an inductor current at a second sampling time towards a reference current value at a first sampling time. In one embodiment, control signal generator 310 includes at least one digital circuit adapted to output a pulse width signal. Control signal generators 310 may include, for example circuits or other generators for producing a PWM control signal by any of an intersective method, delta method, sigma delta method, or other forms of waveform generation and manipulation.

In one embodiment, control signal generator 310 supplies a control signal such as a PWM control signal to at least one output inverter 315. Output inverter 315 may be integral to or external to but associated with UPS 300. Output inverter 315 generally receives direct current (DC) voltage input and provides an alternating current (AC) voltage output to a load that may include for example, a nonlinear load such as a computer load. In various embodiments output inverter 315 includes either a three phase inverter or a single phase inverter. In one embodiment, output inverter 315 may include at least one three level inverter, such as those described in U.S. Pat. Nos. 6,838,925 and 7,126,409, both to Nielsen, the disclosures of which are both incorporated by reference herein.

Output inverter 315 output is, in one embodiment, fed into at least one filter 320. In various embodiments filter 320 may include passive, active, analog, or digital filters. In one embodiment filter 320 includes a low-pass LC filter with at least one inductor 325 and at least one capacitor 330 although other combinations of inductors, capacitors, and resistors may be used. Filter 320 is generally a device configured to modify the harmonic content of signals. For example filter 320 may filter out the switching frequency voltage harmonics including the total harmonic distortion generated by output inverter 315. Filter 320 output, in one embodiment, feeds into at least one rectifier circuit 335. Rectifier circuit 335 generally includes a device that converts AC input, for example from filter 320, to DC output. Rectifier circuit 335 in various embodiments may provide half wave or full wave rectification. Filter 320 may but need not be internal to UPS 300.

In one embodiment rectifier circuit 335 of UPS 300 outputs voltage and/or current to at least one load 340. Load 340 may include a DC load, or a nonlinear or linear load, and in one embodiment load 340 can include rectifier circuit 335. For example, load 340 may include a computer, a server, or other electrical equipment requiring input power. In various embodiments filter 320, rectifier circuit 335, or other UPS 300 components may supply voltage or current to load 340.

UPS 300 as illustrated in FIG. 3 depicts a mode of operation where output inverter 315 supplies voltage and/or current to load 340, which includes, for example a nonlinear load such as a computer load. Load 340 in various embodiments includes servers, computers, communications equipment, data storage equipment, plug-in modules, or any electrical devices or equipment requiring power. Filter 320 in this illustrative embodiment includes a low-pass filter comprising inductor 325 and capacitor 330 to filter out switching frequency harmonics or other unwanted distortion generated by output inverter 315. As illustrated in FIG. 3, $V_I$ represents a voltage at a pole of output inverter 315, $v_c$ represents a voltage across capacitor 330, $I_L$ represents inductor 325 current, $I_C$ represents capacitor 330 charging current, and $I_{Load}$ represents a load current as represented here by equation (1).

$$I_L = I_{Load} + I_C. \tag{1}$$

In an illustrative embodiment and with reference to equation (1) $I_C$ can be less than $I_{Load}$ although this need not always be the case.

Figure 4:
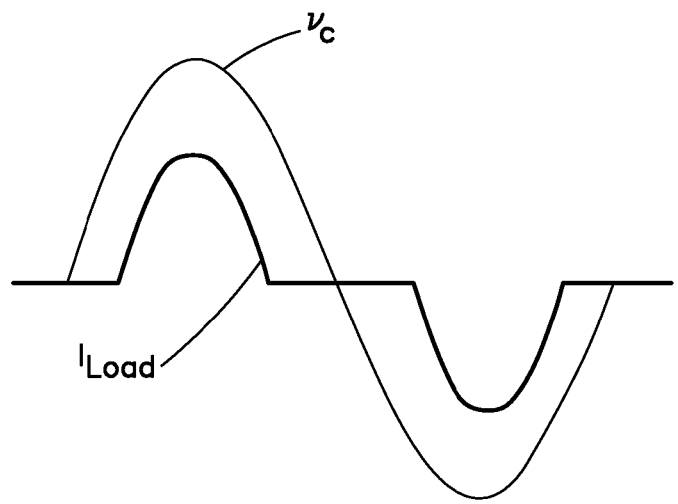
FIG. 4 is a graph illustrating a nonlinear load current output from an uninterruptible power supply in a state of operation.

FIG. 4 is a graph illustrating a sinusoidal capacitor voltage $v_c$ and a nonlinear load current $I_{Load}$ output from uninterruptible power supply 300 in accordance with an embodiment of the invention. As illustrated in the embodiment of FIG. 4, $I_{Load}$ includes a nonlinear load current and $v_c$ includes a sinusoidal voltage. In one embodiment, $I_{Load}$ includes filter 320 current $I_L$ minus capacitor 330 current $I_C$, and $v_c$ includes capacitor 330 voltage.

Figure 5:
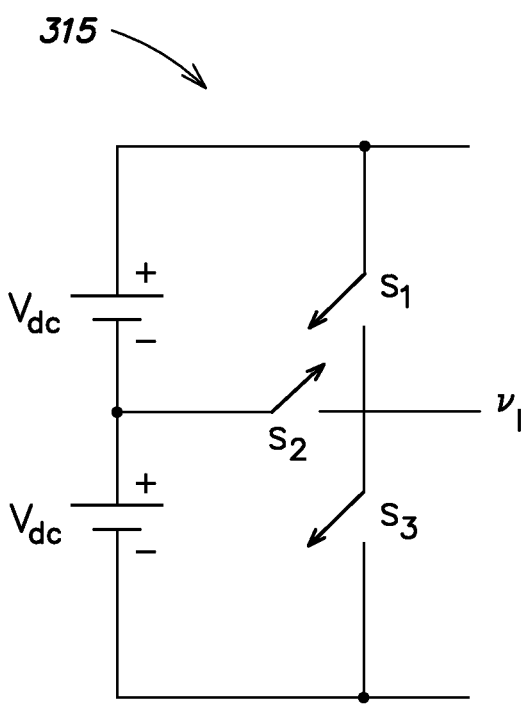
FIG. 5 is a circuit diagram illustrating an output inverter of an uninterruptible power supply in a state of operation.
Figure 6:
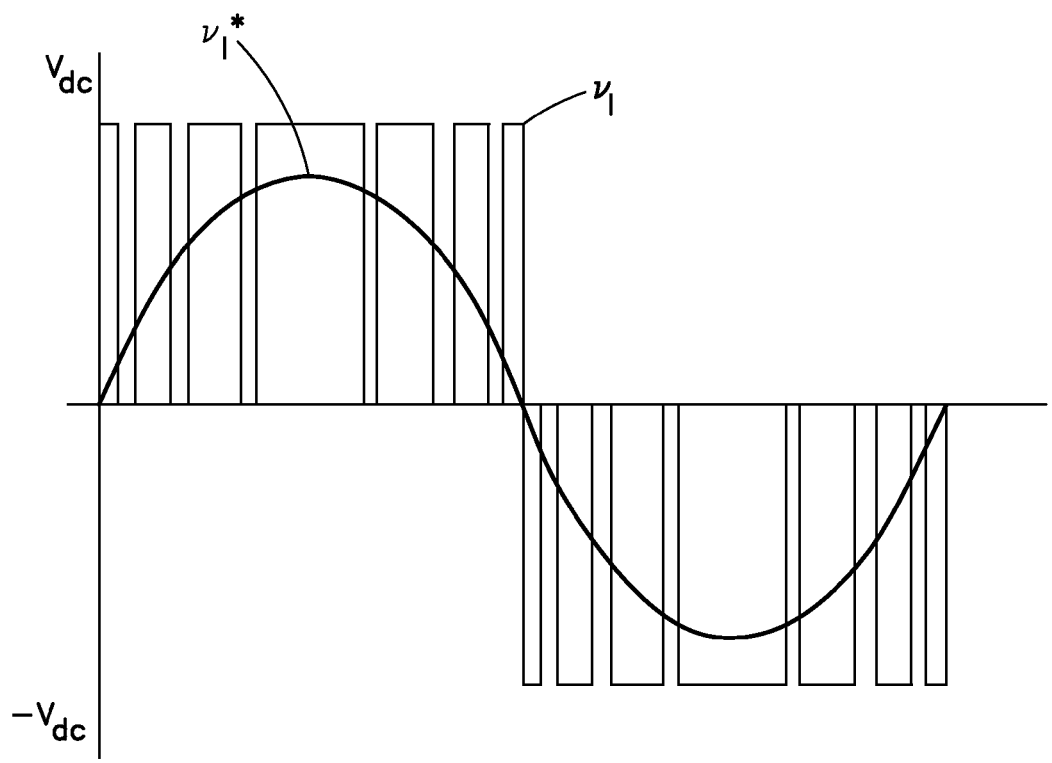
FIG. 6 is a graph illustrating control signal pulses associated with an uninterruptible power supply in a state of operation.

In brief overview, FIG. 5 includes a circuit diagram illustrating output inverter 315 in a mode of operation and in accordance with an embodiment of the invention. In one embodiment output inverter 315 includes a three phase inverter. FIG. 5 illustrates a phase of output inverter 315 in a mode of operation where output inverter 315 includes a voltage $V_I$ that is, in this illustrative embodiment, a function of the control signal (e.g., PWM) pulses of amplitude $V_{dc}$ as shown in FIG. 6. FIG. 6 includes a graph illustrating output inverter 315 voltage $V_I$ and reference output inverter voltage $V_I^*$. In one embodiment the control signal pulses of FIG. 6 are created by control signal generator 310. In an illustrative embodiment of the positive half cycle of FIG. 6, inverter switches S1 and S2 as illustrated in FIG. 5 are turned on (i.e. gated) and off in a complementary fashion with switch S3 off permanently. Conversely, in an illustrative embodiment of the negative half cycle of FIG. 6, inverter switches S3 and S2 of FIG. 5 are turned on in a complementary fashion with switch S1 off.

Figure 7:
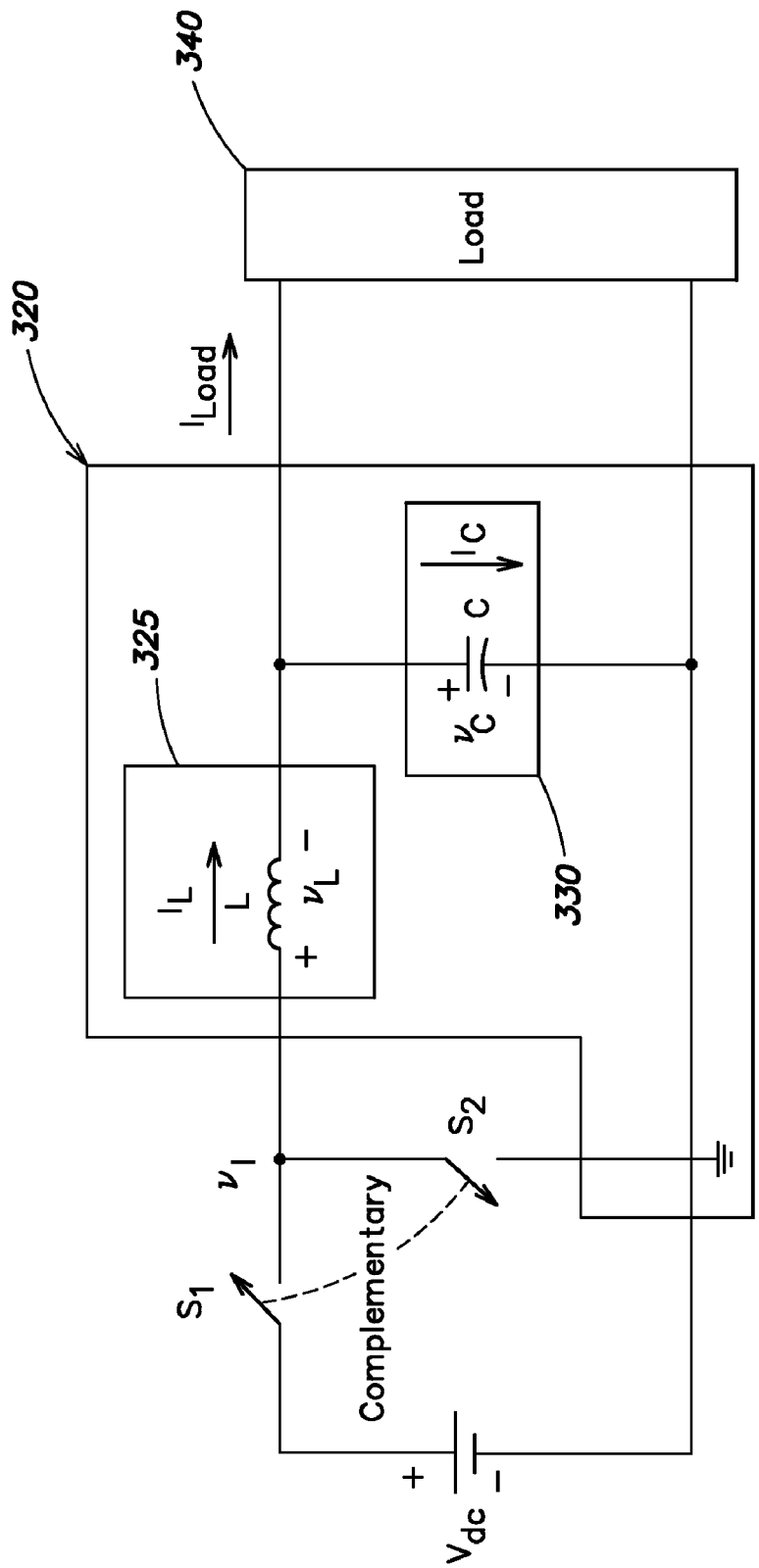
FIG. 7 is a circuit diagram illustrating inverter output voltage of an uninterruptible power supply during a state of operation.
Figure 8:
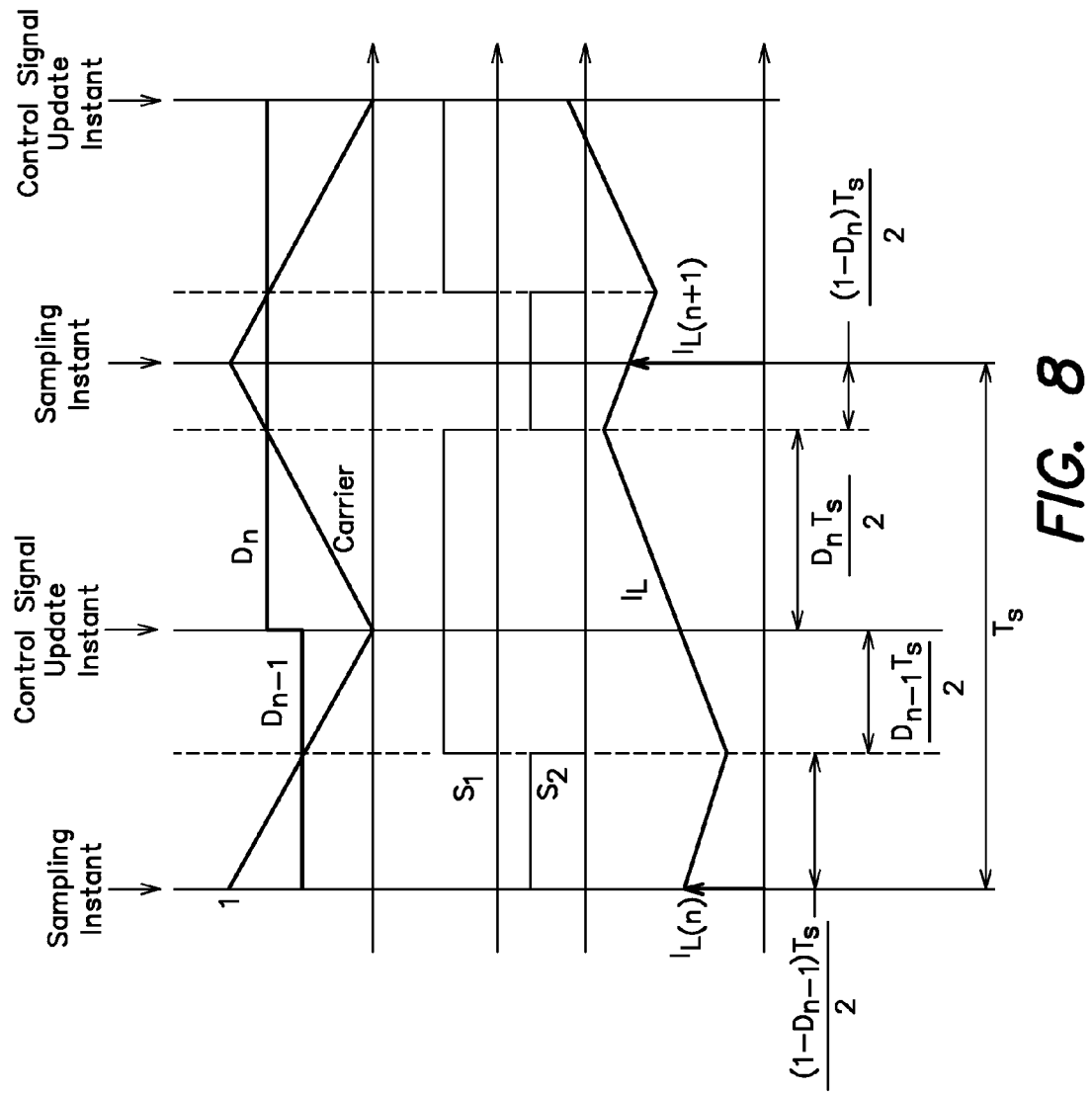
FIG. 8 is a switching diagram illustrating inductor current variation over a switching cycle during a state of uninterruptible power supply operation.

FIG. 7 is an illustrative embodiment of a circuit diagram including inverter 315 output voltage $V_I$ during the positive half cycle depicted in FIG. 6 and in accordance with an embodiment of the invention. For example, in one embodiment a switching cycle $T_S = 1/f_{sw}$ (where $f_{sw}$ is the switching frequency). In this example switch S1 is turned on for certain duration ($T_{on}$) and the switch S2 is turned on for rest of the interval [i.e. ($T_S - T_{on}$)], and D is a duty cycle for the switch S1. Continuing with this illustrative embodiment, FIG. 8 illustrates a switching diagram of output inverter 315 in accordance with an embodiment of the invention with a switching cycle of $T_S$. FIG. 8 illustrates a switching diagram that includes an illustrative variation of inductor 325 current $I_L$ over switching cycle $T_S$ in accordance with an embodiment of the invention. In this illustrative embodiment input quantities are sampled at a sampling instant that is at or near the peak of the carrier signal, and the duty cycle of the control signal (i.e. the duty D) is adjusted at or near the valley of the carrier as shown, resulting in a time delay of $T_S/2$ between input sampling and duty cycle adjustment.

Figure 9:
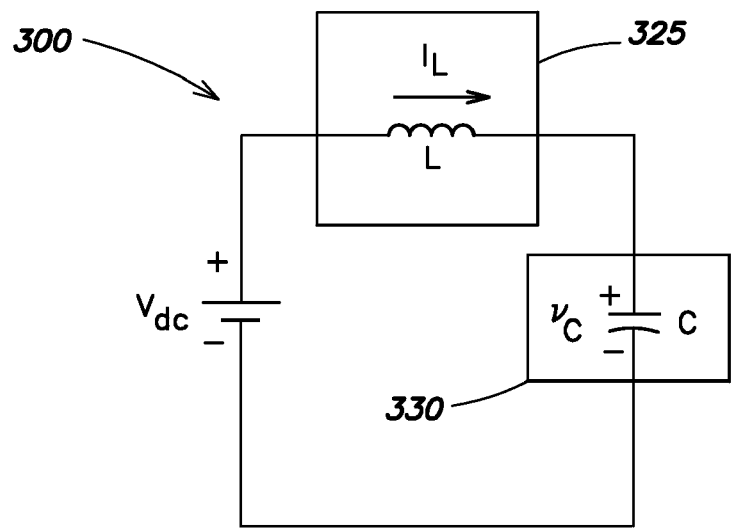
FIG. 9 is a circuit diagram illustrating an uninterruptible power supply in a state of operation.
Figure 10:
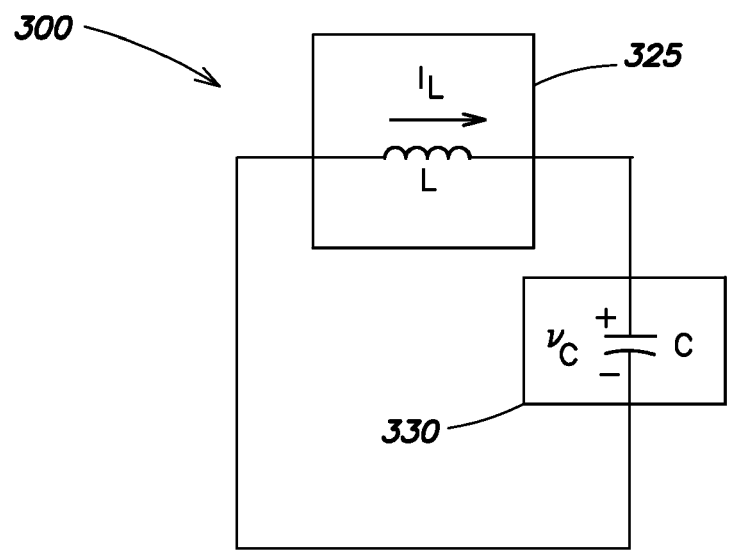
FIG. 10 is an alternate circuit diagram illustrating an uninterruptible power supply in a state of operation.

In various embodiments sampled input quantities such as inductor 325 current $I_L$ and/or sampled capacitor 330 voltage $v_c$ may be sampled at any point in time of the carrier signal and that the duty cycle of the control signal may also be adjusted beginning at any point in time of the carrier signal. The values sampled herein, such as load current, inductor current, or capacitor voltage may be sampled by a current or voltage sensor. In the example illustrated in FIG. 8, inductor 325 current $I_L$ increases when switch S1 is on and decreases when switch S1 is off. The circuit diagrams of this example are illustrated in FIGS. 9 and 10, respectively, where FIG. 9 illustrates a circuit diagram of uninterruptible power supply 300 when switch S1 of FIG. 5 is on and switch S2 is off; and where FIG. 10 illustrates a circuit diagram of uninterruptible power supply 300 when switch S1 of FIG. 5 is off and switch S2 is on, all in accordance with various embodiments of the invention.

Figure 11:
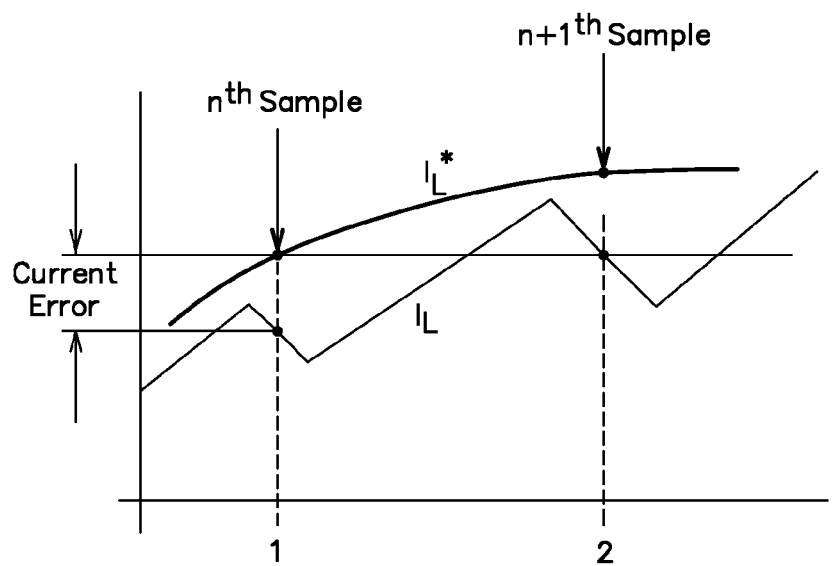
FIG. 11 is a graph illustrating variation in the inductor current of an uninterruptible power supply filter in a state of operation.
Figure 12:
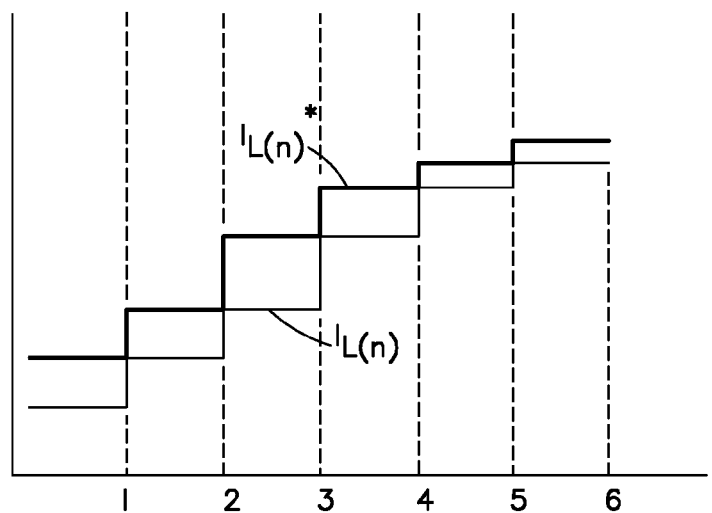
FIG. 12 is a graph illustrating a sampled inductor current of an uninterruptible power supply filter in a state of operation.

In brief overview FIG. 11 is a graph illustrating variation in the inductor current $I_L$ of uninterruptible power supply filter 320 in a state of operation in accordance with an embodiment of the invention. In the embodiment illustrated in FIG. 11, $I_L^*$ is the reference current, $I_L$ is the sampled current of inductor 325, and $e_{I(n)}$ is a current error at a $n^{th}$ sampling time. By adjusting duty cycle $D_n$ of the control signal, current error $e_{I(n)}$ can be driven towards zero before the next $(n+1)^{th}$ sampling time arrives, for example after one switching cycle $T_s$ period (i.e., one sampling period). In embodiments with a nonlinear load 340 there can be a new current error ($e_{I(n+1)}$) at the $(n+1)^{th}$ sampling time, however, by driving $e_{I(n)}$ to or towards zero before the $(n+1)^{th}$ sampling time, sampled current $I_L$ of inductor 325 in this example tracks reference inductor current $I_L^*$ by one sampling time, as depicted in the graph of FIG. 12.

For example and with reference to FIG. 8, at the $n^{th}$ sampling time the current $I_{L(n)}$ of inductor 325 is sampled. In this illustrative embodiment, to estimate the value of inductor current $I_{L(n+1)}$ at the $(n+1)^{th}$ sampling time within switching cycle $T_S$, it is appreciated that inductor current $I_L$ rises with a slope of $(V_{DC} - v_c)/L$ (see FIG. 9) and falls with a slope of $-v_c/L$ (see FIG. 10). Continuing with this example, an expression of $I_{L(n+1)}$ is derived as shown in equation (2).

$$I_{L(n+1)} = I_{L(n)} - \frac{(1-D_{n-1})T_s}{2}\left(\frac{v_{c(n)}}{L}\right) + \frac{(D_n + D_{n-1})T_s}{2}\left(\frac{V_{dc(n)} - v_{c(n)}}{L}\right) - \frac{(1-D_n)T_s}{2}\left(\frac{v_{c(n)}}{L}\right) \tag{2}$$

Equation (2) can be further simplified to get an expression of duty cycle $D_n$ as shown in equations (3)-(6).

$$(I_{L(n+1)} - I_{L(n)}) = \qquad (3)$$
$$\frac{T_s}{2L}[-(1-D_{n-1})v_{c(n)} + (D_n + D_{n-1})(V_{dc(n)} - v_{c(n)}) - (1-D_n)v_{c(n)}]$$

$$(I_{L(n+1)} - I_{L(n)}) = \frac{T_s}{2L}[-v_{c(n)} + D_{n-1}v_{c(n)} + \qquad (4)$$
$$(D_n + D_{n-1})V_{dc(n)} - D_nv_{c(n)} - D_{n-1}v_{c(n)} + D_nv_{c(n)}]$$

$$(I_{L(n+1)} - I_{L(n)}) = \frac{T_s}{2L}[-2v_{c(n)} + (D_n + D_{n-1})V_{dc(n)}] \qquad (5)$$

$$D_n = -D_{n-1} + \frac{2L}{V_{dc(n)}T_s}[I_{L(n+1)} - I_{L(n)}] + \frac{2v_{c(n)}}{V_{dc(n)}} \qquad (6)$$

In this example DC bus voltage $V_{DC}$ is considered constant and predictive inductor current $I_{L(n+1)}$ at the $n^{th}$ switching cycle may be replaced with reference inductor current $I_{L(n)}^*$. (See FIG. 11.) Therefore duty cycle $D_n$ of equation (6) may be written as shown in equation (7).

$$D_n = -D_{n-1} + \left(\frac{2L}{V_{dc}T_s}\right)[I_{L(n)}^* - I_{L(n)}] + \left(\frac{2}{V_{dc}}\right)v_{c(n)} \qquad (7)$$

Figure 13:
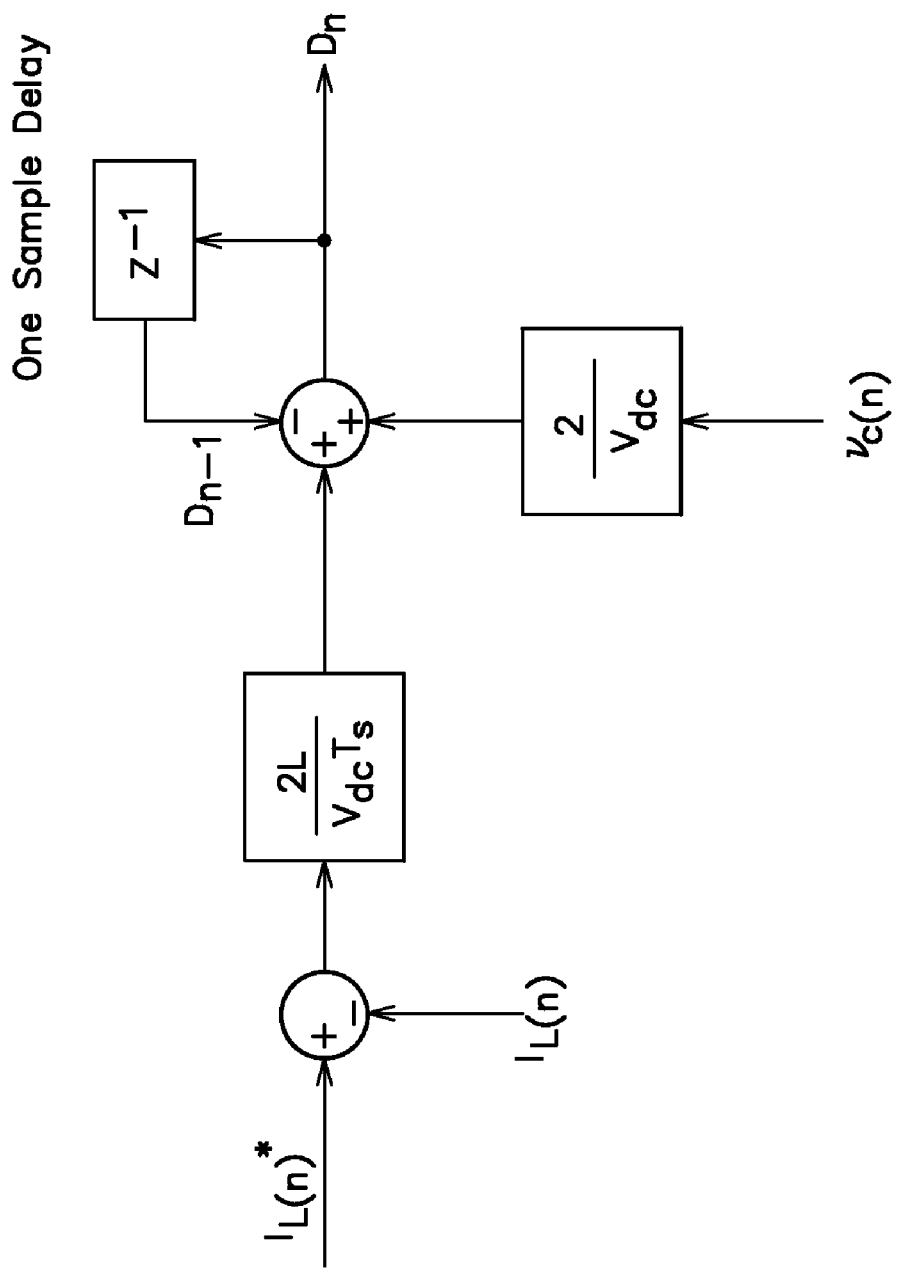
FIG. 13 is a block diagram illustrating predictive current control of an uninterruptible power supply in a state of operation.
Figure 14:
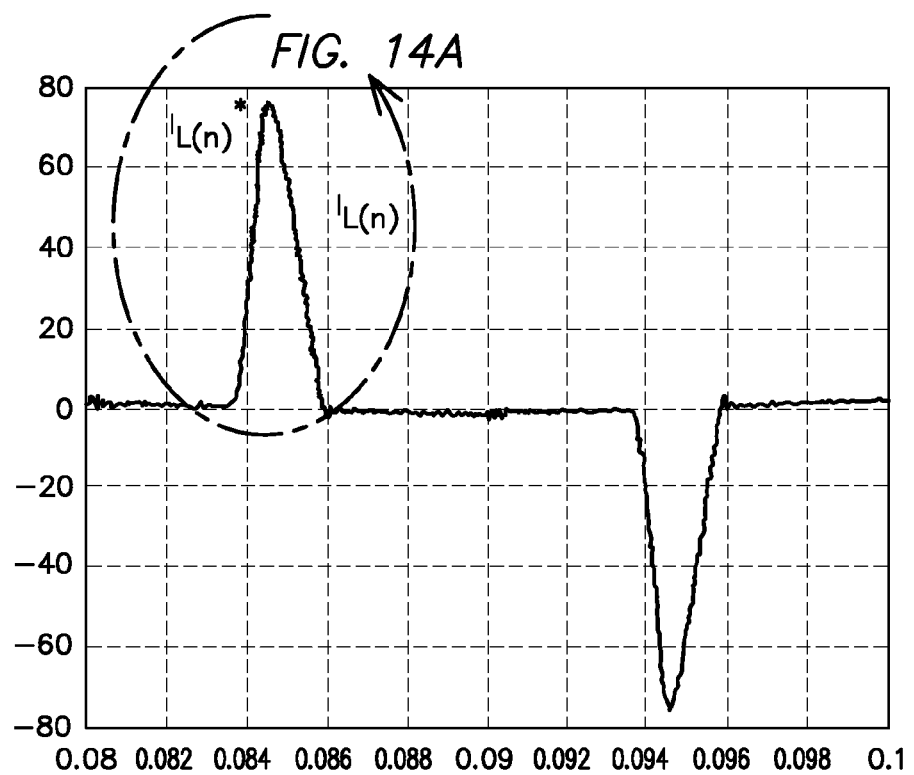
FIG. 14 is a graph illustrating inductor current tracking of an uninterruptible power supply in a state of operation.
Figure 14A:
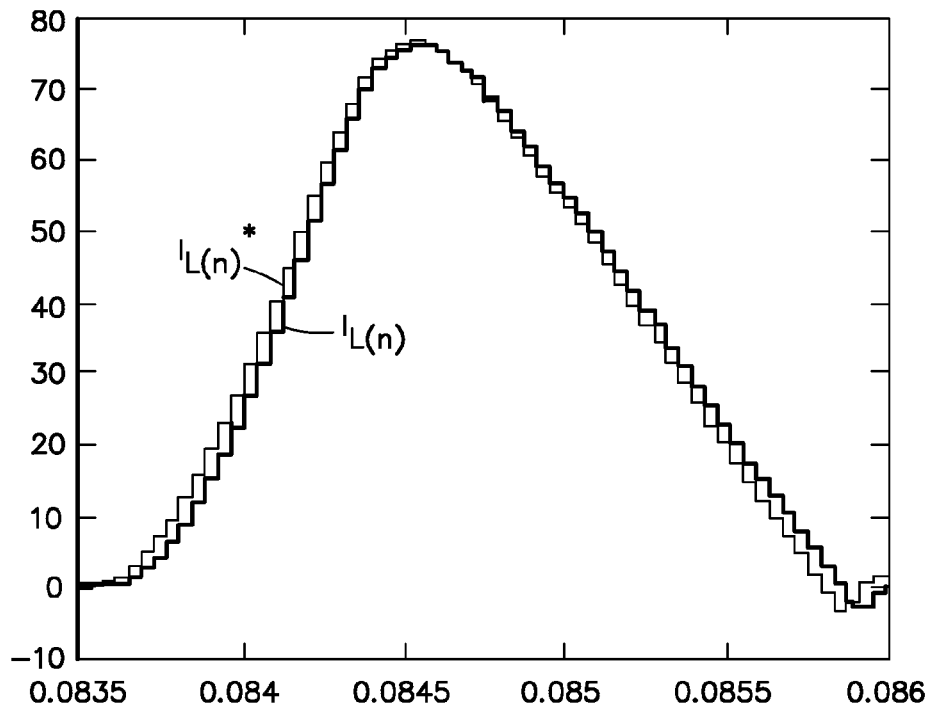
FIG. 14a is a graph illustrating inductor current tracking of an uninterruptible power supply in a state of operation.

In brief overview FIG. 13 illustrates a block diagram of predictive current control corresponding to equation (7) in accordance with an embodiment of the invention. As illustrated in FIG. 12, the inductor current $I_L$ of FIG. 13 generally follows reference inductor current $I_{L(n)}^*$ by one sample period, (i.e. one sample delay or the time between subsequent sampling instants). In other words processor 305 generally modulates a duty cycle $D_n$ as illustrated in FIG. 13, and as described in equation (7) to drive the current $I_{L(n)}$ of inductor 325 towards reference inductor current $I_{L(n)}^*$, offset by one sample period (n). FIG. 14 includes a graph illustrating this embodiment. As can be seen in the graph and in the blow-up insert of FIG. 14A, inductor current $I_{L(n)}$ is driven towards inductor reference current $I_{L(n)}^*$, following it by one sample time in this embodiment. It is appreciated that in various embodiments inductor current $I_{L(n)}$ may be driven towards reference inductor current $I_{L(n)}^*$ with a lag of more or less than one sampling time period. In other words in various embodiments $I_{L(n)}$ may be driven towards a value substantially equal to $I_{L(n)}^*$ offset by two, three, or any number of sampling periods (i.e., switching cycle periods $T_S$). In one embodiment $I_{L(n)}^*$ is predicted at the instant of PWM control signal adjustment, e.g., at or within 10% of the valley of the carrier signal waveform.

Figure 15:
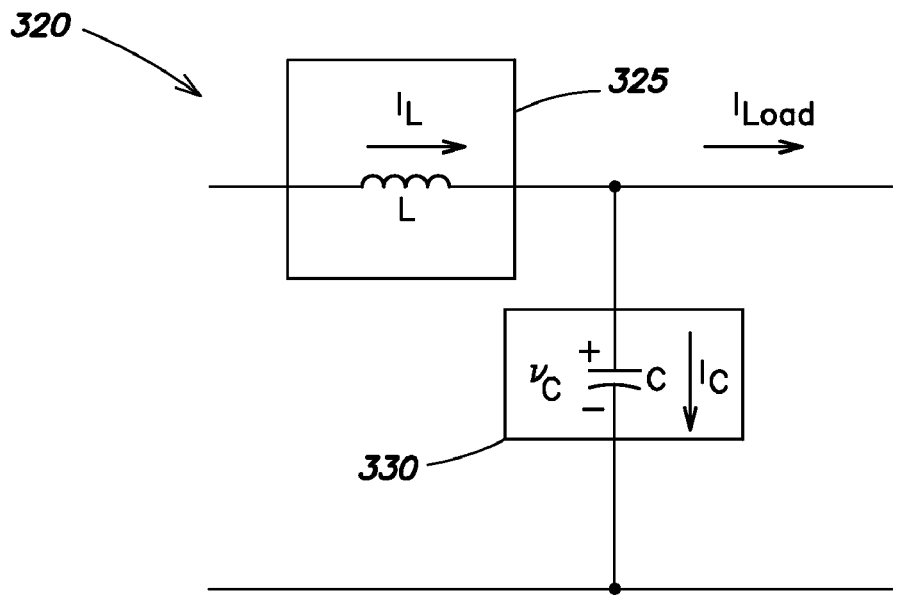
FIG. 15 is a circuit diagram illustrating an uninterruptible power supply filter in a state of operation.

In one embodiment $I_{L(n)}^*$ is determined in part by implementing predictive voltage control. With reference to FIG. 15, which generally depicts a LC (i.e. inductor/capacitor) arrangement of filter 320 in accordance with an embodiment of the invention, $I_C$ is the current through capacitor 330, and $v_c$ is the voltage across capacitor 330. In one embodiment fluctuations in current $I_C$ are used to control voltage $v_c$. In one illustrative embodiment, at the $n^{th}$ sampling time output voltage error is $\Delta v_{c(n)}$. Analogously to the current error $e_{I(n)}$, voltage error $\Delta v_{c(n)}$ is in one embodiment driven towards zero over a period of time $\Delta t = T_s$, i.e., one sampling period. This results in the reference capacitor current $I_{C(n)}^*$ as shown in equation (8).

$$I_{c(n)}^* = C\frac{\Delta v_c(n)}{\Delta t} = \left(\frac{C}{T_s}\right)[v_{c(n)}^* - v_{c(n)}] \qquad (8)$$

Continuing with this illustrative example, reference inductor current $I_{L(n)}^*$ may be obtained using equation (1) (see above) as shown in equation (9) based at least in part on a sampled capacitor voltage $v_c$.

$$I_{L(n)}^* = I_{Load(n)} + I_{C(n)}^*$$

Figure 16:
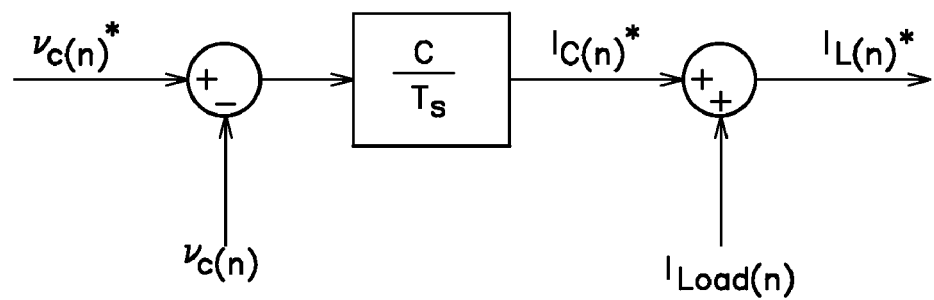
FIG. 16 is a block diagram illustrating predictive voltage control of an uninterruptible power supply in a state of operation.
Figure 17:
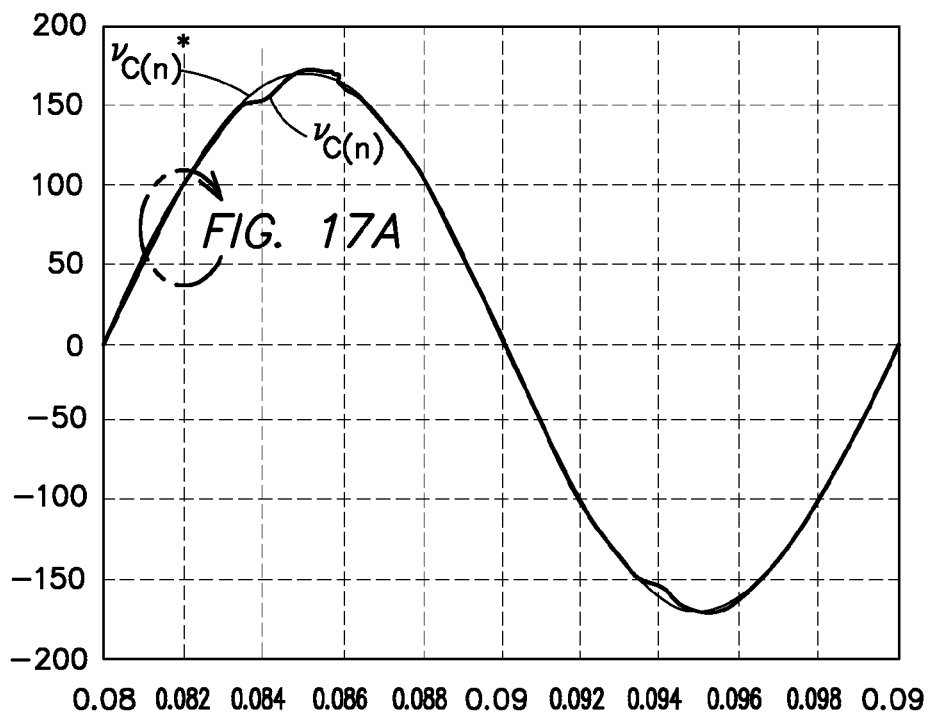
FIG. 17 is a graph illustrating capacitor voltage tracking of an uninterruptible power supply in a state of operation.
Figure 17A:
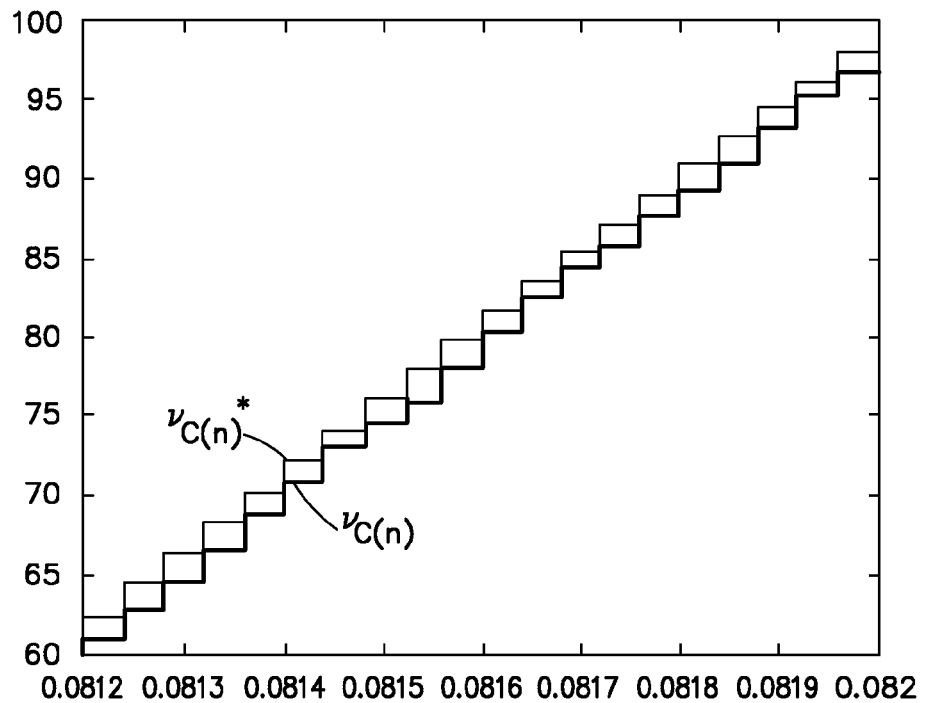
FIG. 17a is a graph illustrating capacitor voltage tracking of an uninterruptible power supply in a state of operation.

In brief overview FIG. 16 depicts a block diagram of a predictive voltage controller in accordance with an embodiment of the invention. As illustrated in FIG. 16, in one embodiment load current $I_{Load\,(n)}$ and capacitor voltage $v_{c(n)}$ can be measured and may be used to compute reference inductor current $I_{L(n)}^*$. FIG. 17 is a graph illustrating an embodiment of predictive voltage control in the example depicted in FIG. 16. As can be seen in FIG. 17 and its blow up insert FIG. 17A, capacitor voltage $v_{c(n)}$ in this embodiment is driven towards reference capacitor voltage $v_{c(n)}^*$, following it by about one sample time, (i.e., about one switching cycle period $T_S$).

Figure 18:
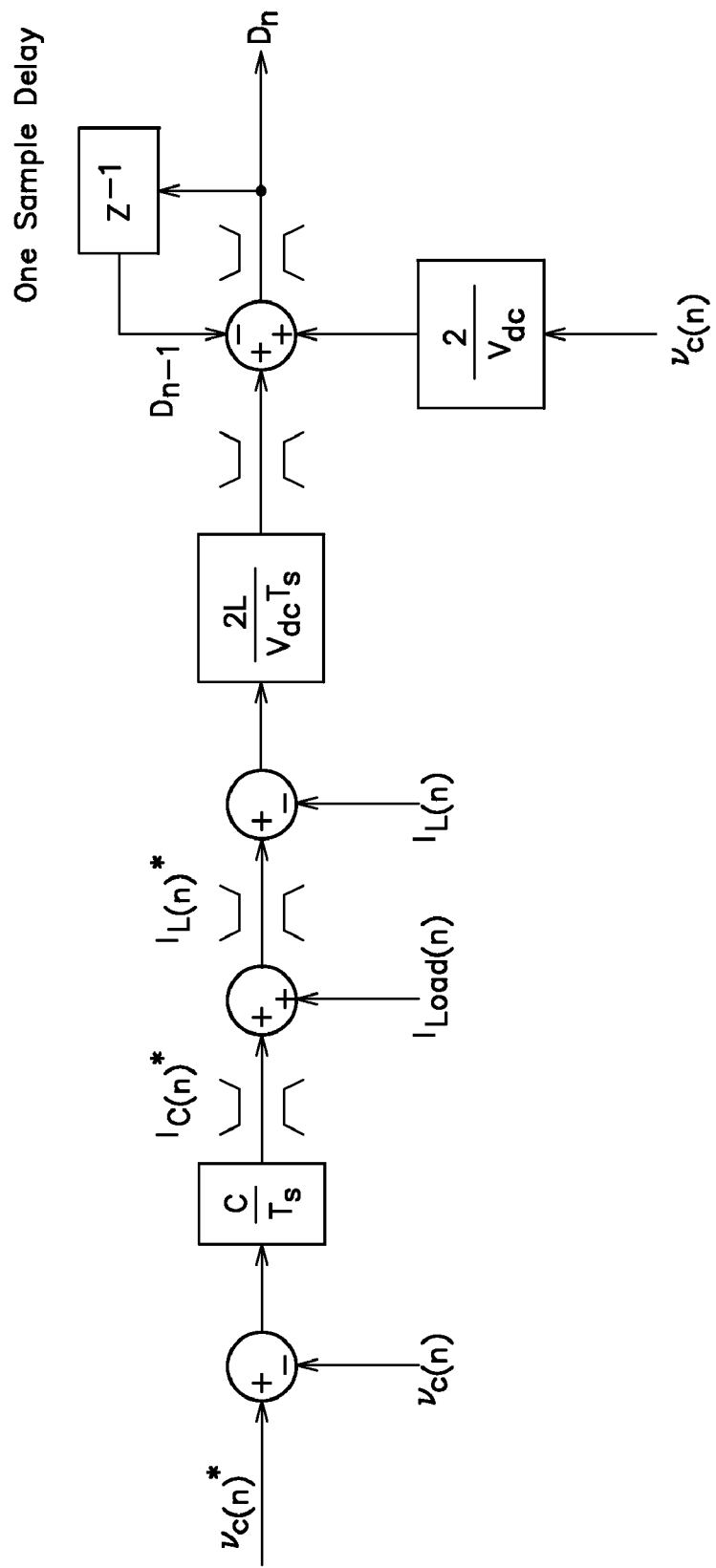
FIG. 18 is a block diagram illustrating predictive current control and predictive voltage control of an uninterruptible power supply in a state of operation.
Figure 19:
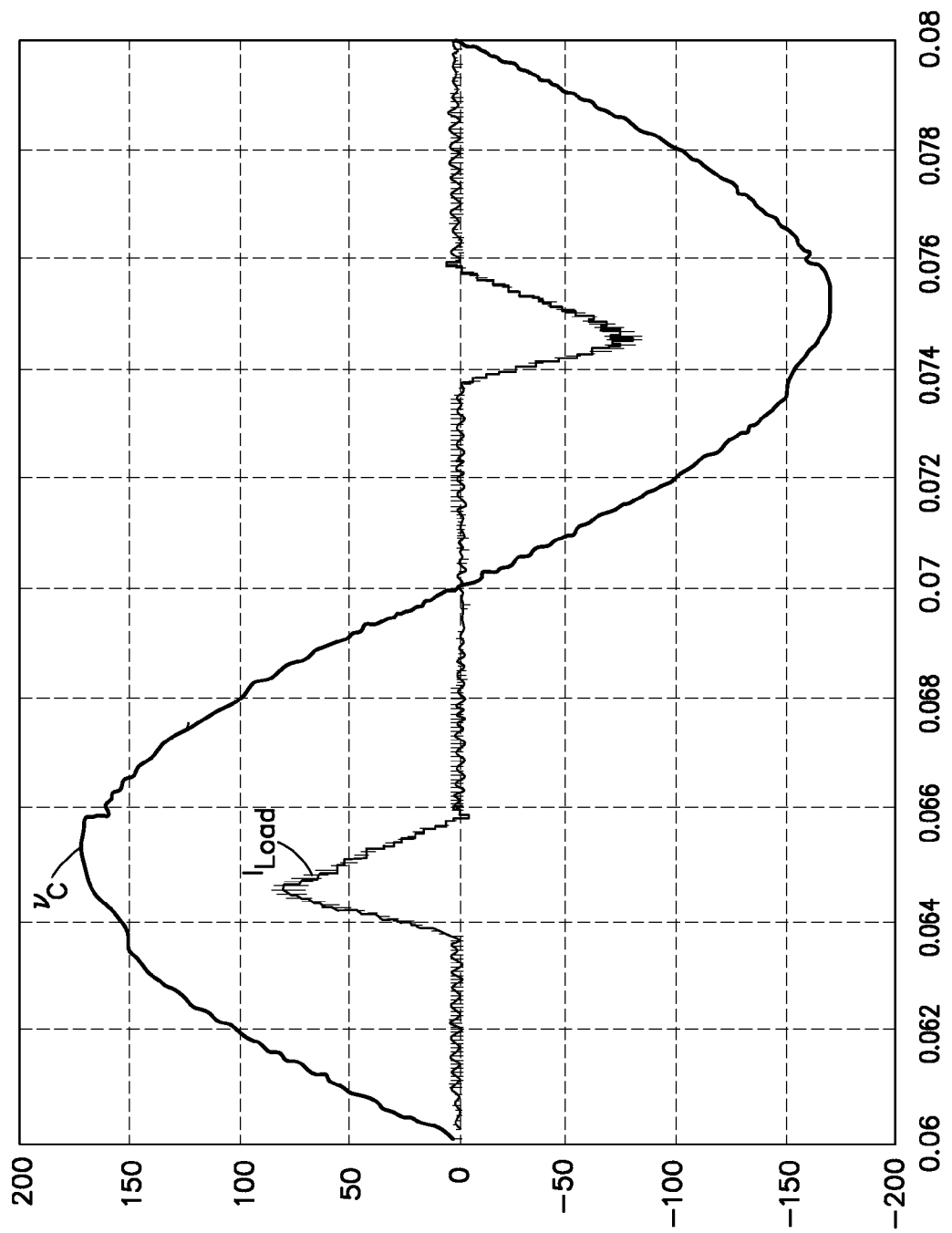
FIG. 19 is a graph illustrating output capacitor voltage and load current of an uninterruptible power supply in a state of operation.

In various embodiments both capacitor 330 predictive voltage control, for example as illustrated in FIG. 16 and inductor 325 predictive current control, for example as illustrated in FIG. 13, may be included as part of or otherwise controlled by processor 305. Furthermore, in one embodiment capacitor 330 voltage control and inductor 325 current control may be combined together into one predictive controller, as depicted in FIG. 18. In one embodiment the controller depicted in FIG. 18 is part of processor 305. In the embodiment illustrated in FIG. 18, a duty cycle $D_n$ of a PWM control signal is adjusted to drive inductor current at a second sampling time (n+1) towards a value substantially equal to the reference current at the first sampling time (n). FIG. 19 depicts a graph illustrating an embodiment of voltage capacitor output $v_c$ together with load current $I_{Load}$ output. In various embodiments the voltage and/or current output can be applied to one or more loads 340, and current and voltage values may be obtained by use of devices such as current sensors and voltage sensors, or they may be estimated.

It is appreciated that as illustrated in FIG. 18 and as seen in equation (9), reference inductor current $I_{L(n)}^*$ can be determined, for example, based on sampled load current $I_{Load}$ and reference capacitor current $I_{C(n)}^*$. In one embodiment with respect to equations (7) to (9) above, $V_{DC}$, $v_c$, and $I_{Load}$ can be deemed constant within a switching cycle $T_S$. However, in another embodiment $I_{Load}$ can vary within a switching cycle $T_S$. This may occur when inverter 315 is supplying nonlinear computer loads, for example.

Figure 20:
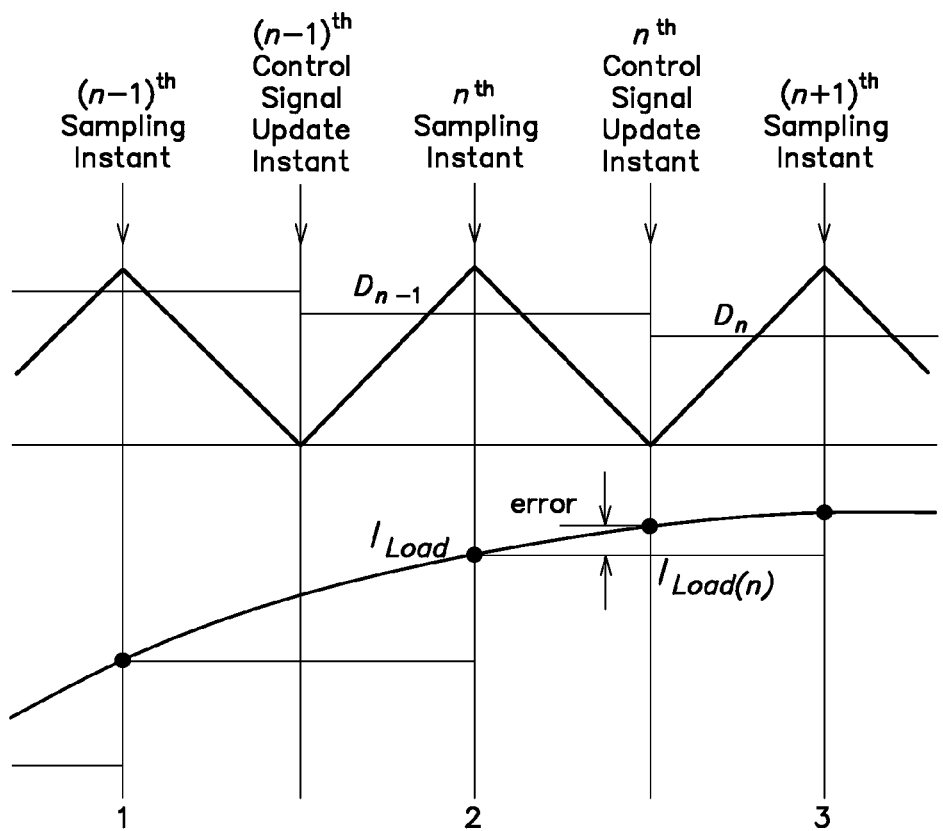
FIG. 20 is a graph illustrating load current of an uninterruptible power supply in a state of operation.

FIG. 20 illustrates an example of load current $I_{Load}$ variation. In the embodiment illustrated in FIG. 20, actual load current $I_{Load}$ within a switching cycle $T_S$ can differ from measured load current $I_{Load\,(n)}$ that in one embodiment can be measured at each sampling instant, such as the $(n-1)^{th}$, $(n)^{th}$, or $(n+1)^{th}$ sampling instant. In the embodiment illustrated in FIG. 20, this error can be seen at the $n^{th}$ sampling update instant that occurs, in this example, in the middle of switching cycle $T_S$, (i.e., $T_S/2$.) This error can, in some embodiments, effect the determination of reference inductor current $I_{L(n)}^*$.

In other words, with respect to the embodiment illustrated in FIG. 20, at the $n^{th}$ sampling instant, $I_{Load}$ and $I_{Load\,(n)}$ can have the same value. In one embodiment, duty cycle $D_n$ sufficient to drive the inductor current $I_{L(n)}$ towards the reference current $I_{L(n)}^*$ may not be applied at the $n^{th}$ sampling instant. Instead, in this illustrative embodiment, duty cycle $D_n$ can be applied at the $n^{th}$ control signal update instant that, in the embodiment illustrated in FIG. 20, can occur about half a switching cycle (i.e., $T_S/2$) after the $n^{th}$ sampling instant. In this illustrative embodiment, $I_{load}$ at the $n^{th}$ sampling instant can be different from $I_{Load}$ at the $n^{th}$ update instant, which can be one half of a switching cycle later. In this example there is a one half carrier period delay ($T_S/2$) between the sampling of $I_{Load\,(n)}$ and the application of duty cycle $D_n$, and during this delay the value of $I_{Load}$ may have changed. (E.g., this change is reflected in the error value indicated in the embodiment illustrated by FIG. 20. This error value can be reflected in reference inductor current $I_{L(n)}^*$ so that reference inductor current $I_{L(n)}^*$ at the $n^{th}$ update instant can be different from the determined reference inductor current of equation (9). This can result in, for example, unwanted discharge or overcharge of capacitor 330.

To eliminate or minimize the effects of this error value, in one embodiment $I_{Load}$ can be determined by extrapolation at an update instant. Because load current $I_{Load}$ corresponding to the $n^{th}$ update instant is generally not available at $n^{th}$ sampling instant, this value can be extrapolated, as, for example, indicated in equation (10), where $I_{Load}\,ex(n)$ is the extrapolated load current for the $n^{th}$ switching cycle.

$$I_{Load\_ex(n)} = I_{Load(n)} + \frac{(I_{Load(n)} - I_{Load(n-1)})}{T_s} \times \frac{T_s}{2} \quad (10)$$

$$= \frac{3}{2} I_{Load(n)} - \frac{1}{2} I_{Load(n-1)}$$

Figure 21:
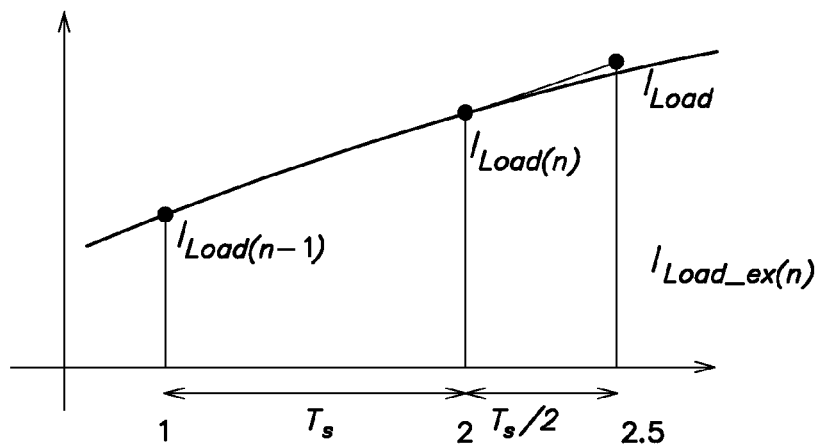
FIG. 21 is a graph illustrating load current extrapolation for an uninterruptible power supply in a state of operation.
Figure 22:
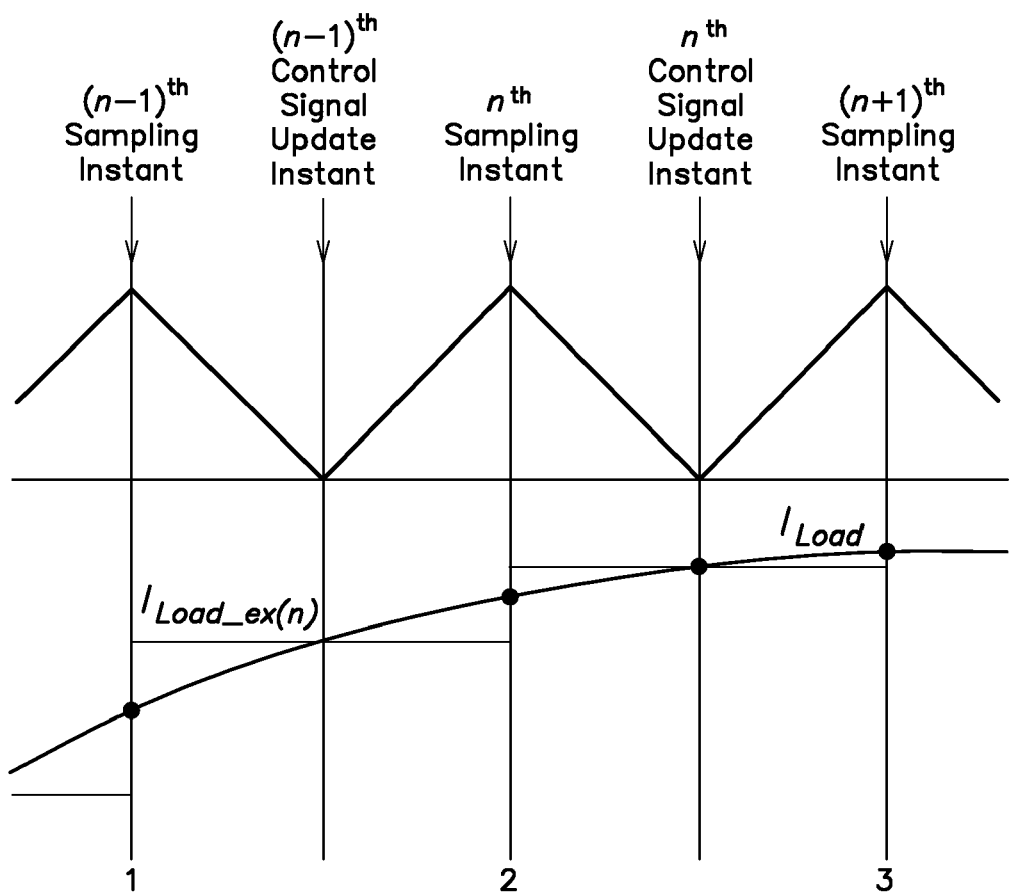
FIG. 22 is a graph illustrating load current extrapolation for an uninterruptible power supply in a state of operation.

FIG. 21, depicts a graph illustrating load current extrapolation to determine $I_{Load\_ex(n)}$ of equation (10) for the $n^{th}$ switching cycle $T_S$ for an uninterruptible power supply in a state of operation. FIG. 22 generally depicts the variation of actual and extrapolated load current over a number of switching cycles $T_S$. In the embodiment illustrated in FIG. 22 it is appreciated that $I_{Load\_ex(n)}$ intersects with $I_{Load\,(n)}$ at each update instant.

Figure 23:
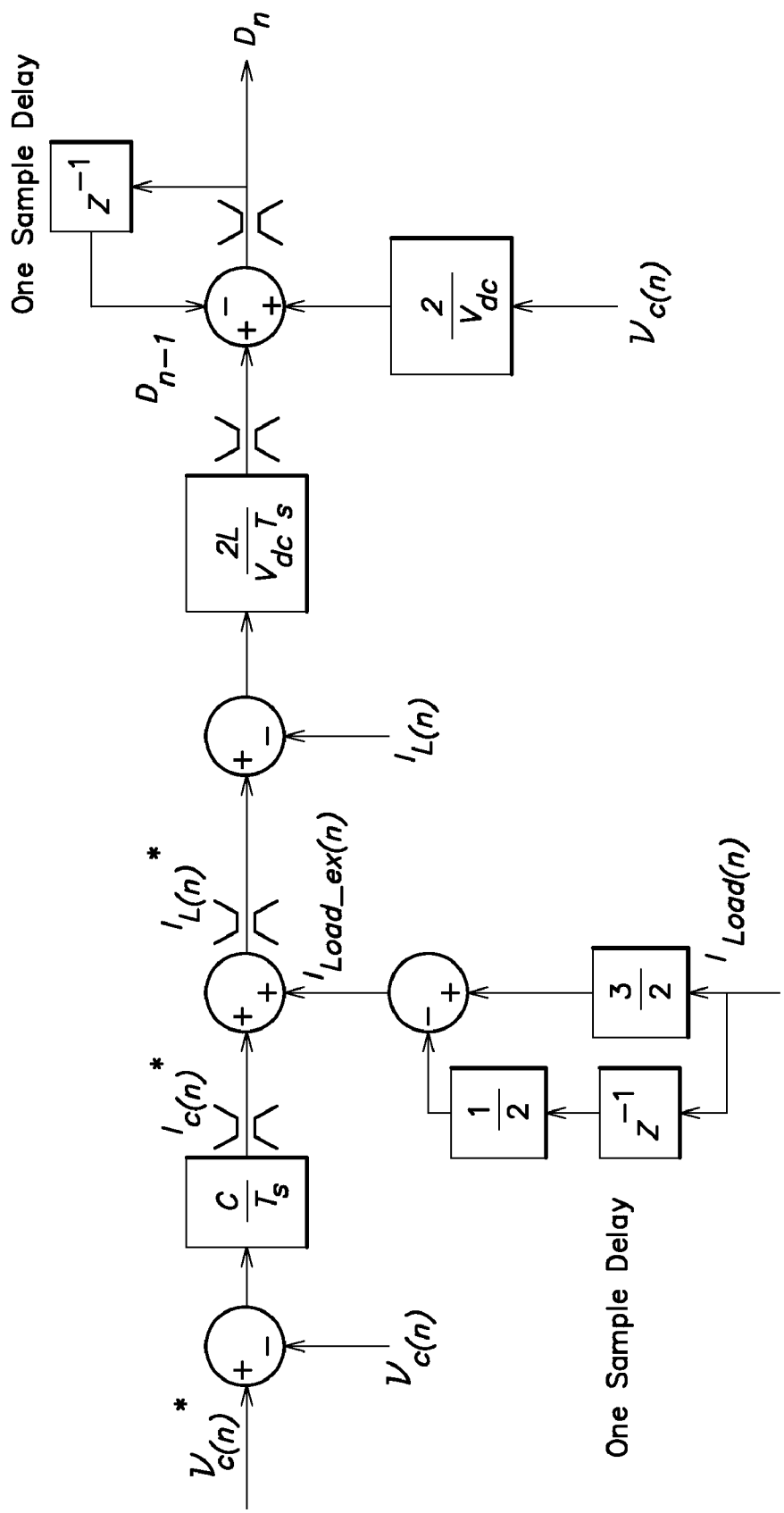
FIG. 23 is a block diagram illustrating predictive current control and predictive voltage control of an uninterruptible power supply including load current extrapolation in a state of operation.

FIG. 23 generally depicts a block diagram illustrating predictive current control and predictive voltage control of an uninterruptible power supply in an embodiment where load current $I_{Load(n)}$ includes extrapolated load current $I_{Load\_ex(n)}$. In one embodiment extrapolating load current $I_{Load\_ex(n)}$ to determine load current value at the $n^{th}$ update instant at or near a valley of the carrier signal can further reduce levels of Total Harmonic Distortion (THD) over uninterruptible power supply control schemes where $I_{Load}$ is sampled at the $n^{th}$ sampling instant that is at or near a peak of the carrier signal. In one example extrapolating the load current in this manner can reduce THD levels by a further 0.4% to 1.0% to approximately 3.5% or less of inverter 315 output.

Figure 24:
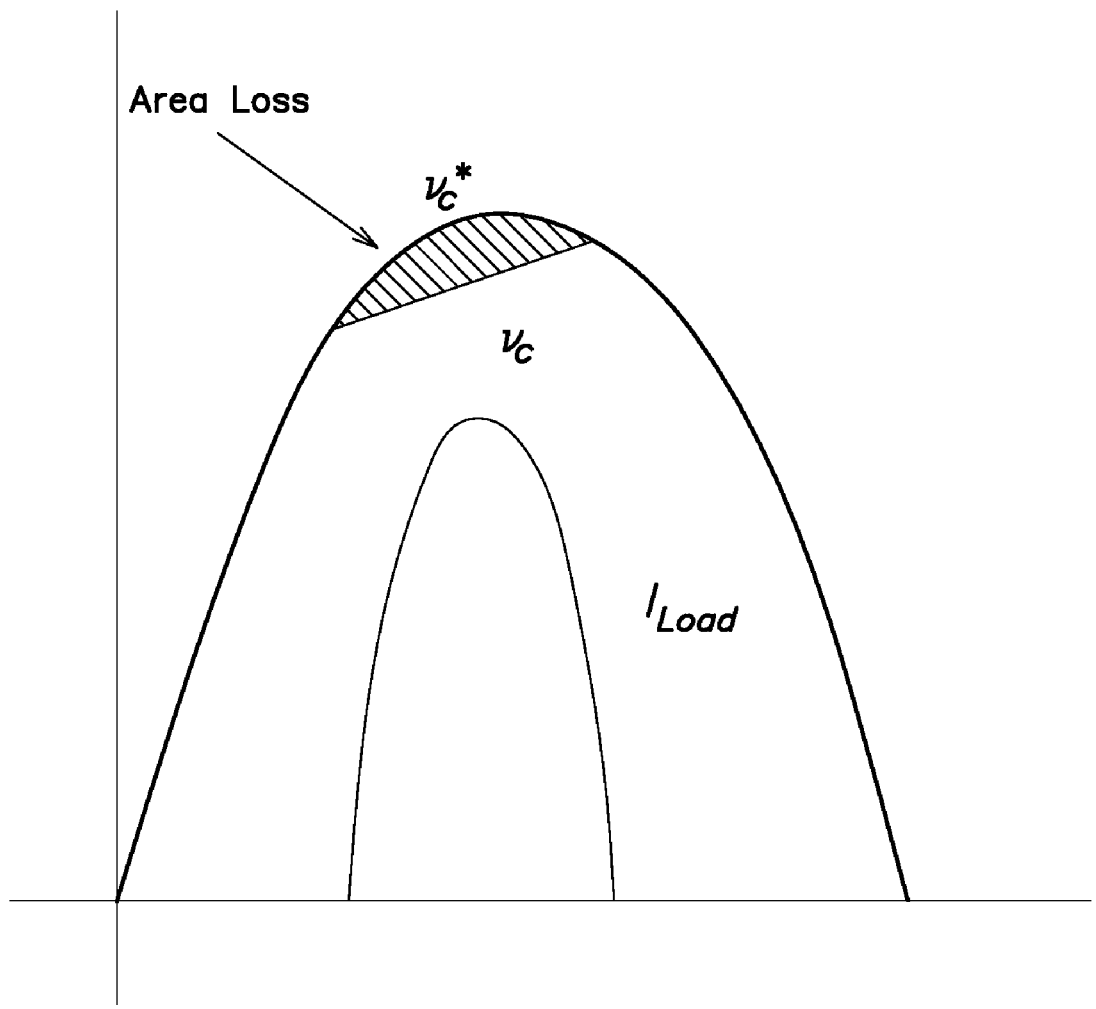
FIG. 24 is a graph illustrating a capacitor reference voltage for an uninterruptible power supply in a state of operation.
Figure 25:
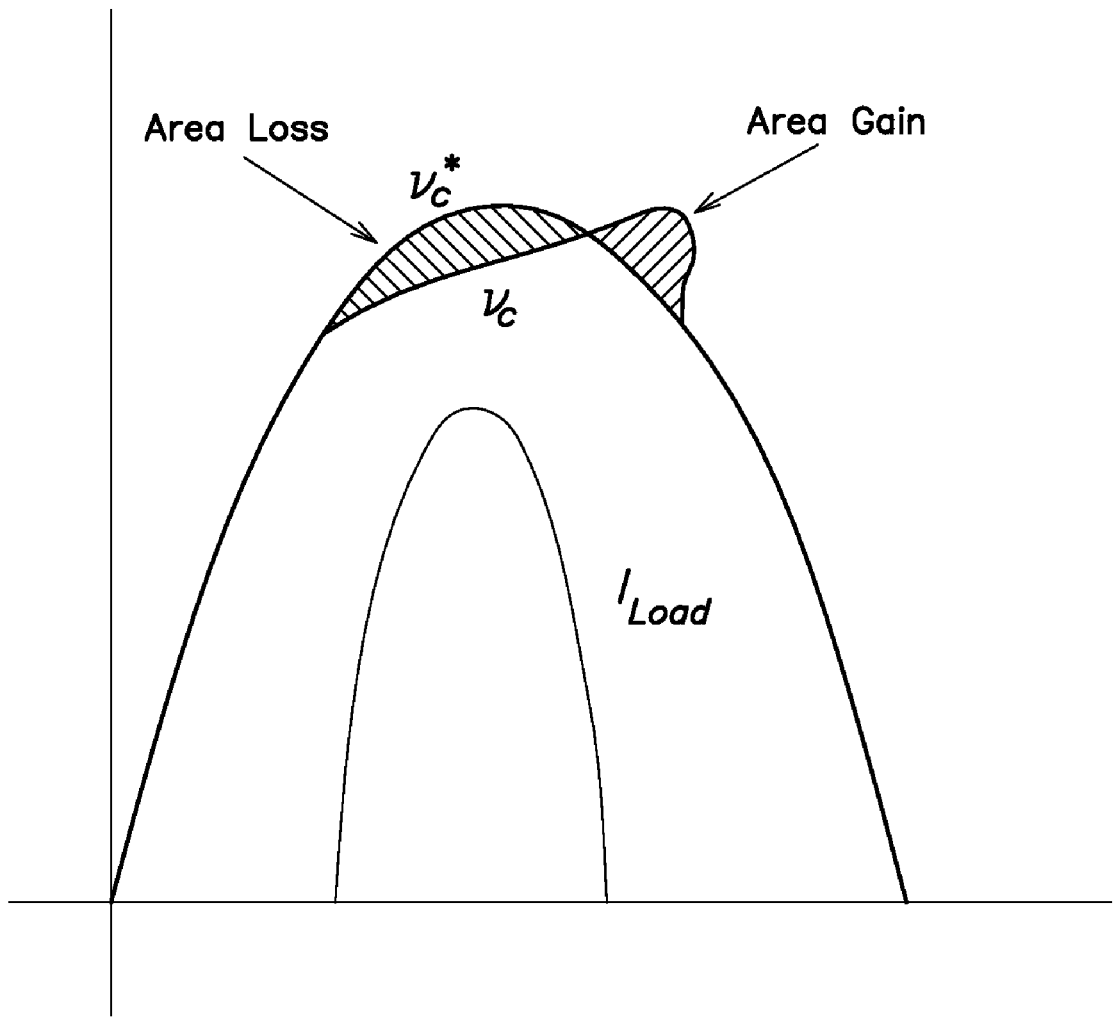
FIG. 25 is a graph illustrating a capacitor reference voltage for an uninterruptible power supply in a state of operation.

In one embodiment, the steady state root mean squared (RMS) voltage $v_c$ of capacitor 330 can decrease from a no-load value of, for example, 120V as UPS output power is increased. This may occur in embodiments including a nonlinear load 340 such as a computer. In one embodiment RMS output voltage correction may be applied to $v_c$ to prevent or minimize this decrease. For example, use of a proportional (P-type) voltage controller instead of a proportional-integral (PI-type) controller can result in a decrease in RMS $v_c$ from 120V to about 116-117V at full load. One embodiment illustrating this voltage loss is depicted in FIG. 24 for a P-type controller and FIG. 25 for a PI-type controller. As depicted in these two figures, $v_c$ drops from reference voltage $v_c^*$ at or near full $I_{Load}$ conditions. As illustrated in FIG. 25, in one embodiment integral action of a PI-type controller can result in some additional $v_c$ gain that would not occur when using a P-type controller. However, in both cases some $v_c$ loss may occur, although generally $v_c$ loss is greater when using a P-type controller than when using a PI-type controller.

Figure 26:
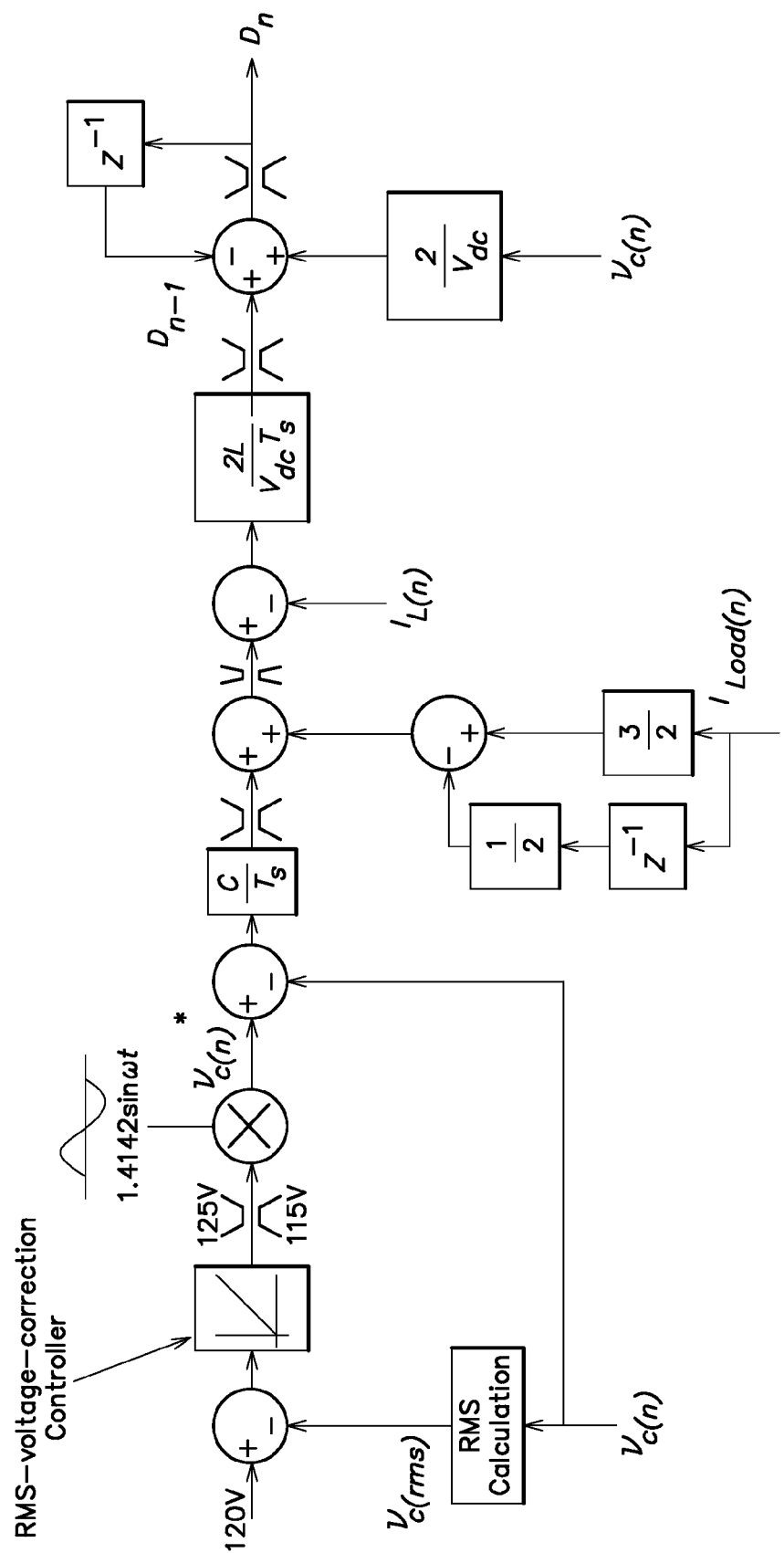
FIG. 26 is a block diagram illustrating predictive current control and predictive voltage control of an uninterruptible power supply including load current extrapolation and root mean squared voltage correction in a state of operation.

In one embodiment, the drop in RMS $v_c$ can be corrected be employing a RMS correction loop as illustrated in FIG. 26. The RMS correction loop in an embodiment adjusts reference voltage $v_c^*$ so that steady state RMS $v_c$ remains at 120V at full load. In one embodiment, $v_c$ can be 120V at a no-load condition greater than or equal to 119V at a full load condition. To do so, for example, the bandwidth of the RMS voltage correction loop may be designed to be one order less than the bandwidth of the predictive voltage control loop. This can avoid unwanted interaction between the RMS voltage correction loop and the predictive voltage and current control loops. From FIG. 26, it is appreciated that in one embodiment RMS voltage correction loop can include an integral type controller to compensate for a steady state drop in $v_c$ and to keep $v_c$ at or near $v_c^*$ at any load 340 condition, including a full load condition for a nonlinear load 340.

In at least one embodiment the elements of UPS 300 include the elements of UPS 100. For example in various embodiments processor 305 includes controller 130; output inverter 315 includes inverter 120; load 340 includes load 140, et cetera. It is further evident that in one embodiment UPS 300 includes elements not shown that correspond to elements of FIG. 1, such as battery 150 or multiple input, output, or neutral lines, for example.

Note that in FIGS. 1 through 26, the enumerated items are shown as individual elements. In actual implementations of the systems and methods described herein, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it is appreciated that the systems and methods described herein afford a simple and effective way to distribute power to a load. The systems and methods according to various embodiments are able to adjust a duty cycle of a PWM control signal to control uninterruptible supply voltage and current output, and are able to filter harmonic distortion from these outputs. This increases efficiency, reliability, and compatibility, and lowers cost.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references such as "an embodiment", "some embodiments", "an alternate embodiment", "various embodiments", or the like are not necessarily mutually exclusive. Any embodiment may be combined with any other embodiment in any manner consistent with the objects, aims, and needs disclosed herein.

Where technical features mentioned in any claim are followed by references signs, the reference signs have been included for the sole purpose of increasing the intelligibility of the claims and accordingly, neither the reference signs nor their absence have any limiting effect on the scope of any claim elements.

One skilled in the art will realize the systems and methods described herein may be embodied in other specific forms without departing from the spirit or essential characteristics thereof. For example, inputs and outputs as described herein may include multiple connections for respectively coupling to a voltage source and a load. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A method of distributing power to a load using an uninterruptible power supply having an output inverter and a filter, the filter having an inductor and a capacitor, comprising:
applying a pulse width modulation control signal to the output inverter;
sampling inductor current at a first sampling time at a beginning of one switching cycle and a second sampling time at an end of the one switching cycle, the one switching cycle having a time period extending from the beginning of the one switching cycle to the end of the one switching cycle;
comparing the inductor current at the first sampling time with a reference current at the first sampling time;
adjusting a duty cycle of the pulse width modulation control signal during the time period to drive the inductor current at the second sampling time towards a value of the reference current at the first sampling time; and
applying an output voltage of the uninterruptible power supply to the load.

2. The method of claim 1, comprising:
filtering harmonic distortion from the output inverter.

3. The method of claim 2, wherein harmonic distortion output is less than or equal to 3.4% of an inverter output signal.

4. The method of claim 1, comprising:
sampling a voltage of the capacitor at the first sampling time;
obtaining the reference current at the first sampling time based at least in part on the inductor current at the first sampling time and the voltage of the capacitor at the first sampling time.

5. The method of claim 4, comprising:
initiating adjustment of the duty cycle at a first time within 10% of a first valley of a carrier signal waveform; and
obtaining an updated value of the reference current at a second time within 10% of a second valley of the carrier signal waveform.

6. The method of claim 4, comprising:
sampling a voltage of the capacitor at the second sampling time; and
wherein adjusting the duty cycle includes driving the voltage of the capacitor at the second sampling time towards a value substantially equal to a reference voltage of the capacitor at the first sampling time.

7. The method of claim 6, comprising:
adjusting the reference voltage to drive the output voltage towards a no-load voltage.

8. The method of claim 7 wherein the no-load voltage is greater than 119V.

9. The method of claim 1 wherein the reference current at the first sampling time is within 10% of the inductor current at the second sampling time.

10. The method of claim 1, comprising:
applying a load current of the uninterruptible power supply to the load.

11. The method of claim 1 wherein the first sampling time comprises a time within 10% of a first peak of a carrier signal; and wherein the second sampling time comprises a time within 10% of a second peak of the carrier signal.

12. The method of claim 11 wherein adjusting the duty cycle comprises:
initiating the adjustment of the duty cycle within a time period less than or equal to half of the time period of the one switching cycle.

13. The method of claim 11 wherein the first peak and the second peak are subsequent peaks of the carrier signal.

14. The method of claim 13 wherein adjusting the duty cycle comprises:
initiating adjustment of the duty cycle at a time within 10% of a valley of the carrier signal.

15. The method of claim 14, comprising:
sampling a load current output from the uninterruptable power supply at the first sampling time; and
determining the reference current based at least in part on an evaluation of the load current.

16. The method of claim 14, comprising:
sampling a load current output from the uninterruptable power supply at the first sampling time;
extrapolating the load current to determine a load current value at the valley of the carrier signal; and
determining the reference current based at least in part on an evaluation of the extrapolated load current.

17. The method of claim 1 wherein the first sampling time comprises a time within 10% of a first valley of a carrier signal; and wherein the second sampling time comprises a time within 10% of a second valley of the carrier signal.

18. The method of claim 17 wherein the first valley and the second valley are subsequent valleys of the carrier signal.

19. The method of claim 18 wherein adjusting the duty cycle comprises:
initiating adjustment of the duty cycle at a time within 10% of a peak of the carrier signal.

20. The method of claim 19, comprising:
sampling a load current output from the uninterruptable power supply at the first sampling time; and
determining the reference current based at least in part on an evaluation of the load current.

21. The method of claim 19, comprising:
sampling a load current output from the uninterruptable power supply at the first sampling time;
extrapolating the load current to determine a load current value at the peak of the carrier signal; and
determining the reference current based at least in part on an evaluation of the extrapolated load current.

22. The method of claim 1 wherein adjusting the duty cycle comprises determining the reference current by:
implementing predictive uninterruptible power supply inverter voltage control based at least in part on a capacitance voltage of the capacitor; and
implementing predictive uninterruptible power supply inverter current control based at least in part on the inductor current.

23. The method of claim 1, wherein sampling inductor current comprises sampling inductor current with at least one current sensor.

24. The method of claim 1, wherein the load comprises at least one of a computer, a server, electronic communications equipment, and data storage equipment.

25. The method of claim 1, wherein applying the pulse width modulation control signal, sampling inductor current, comparing the inductor current with the reference current, adjusting the duty cycle, and applying the output voltage are performed by a processor, and wherein the method is implemented in a program stored in a computer readable medium and executed by the processor.

26. An uninterruptible power supply having an output inverter and a filter, the filter having an inductor and a capacitor, comprising:
  a processor configured to apply a pulse width modulation control signal to the output inverter;
  the processor configured to sample inductor current at a first sampling time at a beginning of one switching cycle and a second sampling time at an end of the one switching cycle, the one switching cycle having a time period extending from the beginning of the one switching cycle to the end of the one switching cycle;
  the processor configured to compare the inductor current at the first sampling time with a reference current at the first sampling time; and
  the processor configured to adjust a duty cycle of the pulse width modulation control signal during the time period to drive the inductor current at the second sampling time towards a value of substantially equal to the reference current at the first sampling time; and
  the uninterruptible power supply configured to apply an output voltage for a load.

27. The uninterruptible power supply of claim 26, comprising:
  a filter adapted to filter harmonic distortion from the output inverter.

28. The uninterruptible power supply of claim 27, wherein harmonic distortion output is less than or equal to 3.4% of an inverter output signal.

29. The uninterruptible power supply of claim 26, comprising:
  the processor configured to sample a voltage of the capacitor at the first sampling time;
  the processor configured to determine the reference current at the first sampling time based at least in part on the inductor current at the first sampling time and the voltage of the capacitor at the first sampling time.

30. The uninterruptible power supply of claim 29, wherein the voltage of the capacitor is substantially equal to the output voltage.

31. The uninterruptible power supply of claim 29, comprising:
  the processor configured to initiate adjustment of the duty cycle at a first time within 10% of a first valley of a carrier signal waveform; and
  the processor configured to determine an updated value of the reference current at a second time within 10% of a second valley of the carrier signal waveform.

32. The uninterruptible power supply of claim 31, wherein a first peak occurs within a time period that is substantially half of the time period of the one switching cycle after the first valley.

33. The uninterruptible power supply of claim 29, comprising:
  the processor configured to sample a voltage of the capacitor at the second sampling time; and
  wherein the processor adjusts the duty cycle to drive the voltage of the capacitor at the second sampling time towards a value substantially equal to a reference voltage of the capacitor at the first sampling time.

34. The uninterruptible power supply of claim 26 wherein the first sampling time comprises a time within 10% of a first peak of a carrier signal; and wherein the second sampling time comprises a time within 10% of a second peak of the carrier signal.

35. The uninterruptible power supply of claim 34 wherein the first peak and the second peak are subsequent peaks of the carrier signal.

36. The uninterruptible power supply of claim 34 wherein the processor is configured to initiate adjustment of the duty cycle at a time within 10% of a valley of the carrier signal.

37. The uninterruptible power supply of claim 34 wherein the processor adjusts the duty cycle within a time period less than or equal to half of the time period of the one switching cycle.

38. The uninterruptible power supply of claim 26, wherein the output voltage is substantially equal to 120V.

39. The uninterruptible power supply of claim 26 wherein the first sampling time comprises a time within 10% of a first valley of a carrier signal; and wherein the second sampling time comprises a time within 10% of a second valley of the carrier signal.

40. The uninterruptible power supply of claim 39 wherein the first valley and the second valley are subsequent valleys of the carrier signal.

41. The uninterruptible power supply of claim 39 wherein the processor is configured to initiate adjustment of the duty cycle at a time within 10% of a peak of the carrier signal.

42. The uninterruptible power supply of claim 26, wherein the load comprises at least one of a computer, a server, electronic communications equipment, and data storage equipment.

43. The uninterruptible power supply of claim 26, comprising:
  at least one current sensor associated with the processor and configured to sample inductor current at the first sampling time or at the second sampling time.

44. The uninterruptible power supply of claim 26, wherein the uninterruptible power supply comprises a three phase uninterruptible power supply.

45. An uninterruptible power supply, comprising:
  an input module configured to receive a pulse width modulation control signal;
  a control module including an output inverter and a filter, the filter having an inductor;
  an output module coupled to the input module and to the control module to provide output power to a load in response to the pulse width modulation control signal; and
  means for adjusting a duty cycle of the pulse width modulation control signal to drive current through the inductor towards a reference current value within a time period less than or equal to a switching cycle time period of a carrier signal associated with the pulse width modulation control signal.

46. A computer readable medium having stored thereon sequences of instruction including instructions that will cause a processor to:
  apply a pulse width modulation control signal to an output inverter of a power supply, the power supply including a filter having an inductor and a capacitor;
  sample inductor current at a first sampling time at a beginning of one switching cycle and a second sampling time at an end of the one switching cycle, the one switching cycle having a time period extending from the beginning of the one switching cycle to the end of the one switching cycle;
compare the inductor current at the first sampling time with a reference current at the first sampling time;
adjust a duty cycle of the pulse width modulation control signal during the time period to drive the inductor current at the second sampling time towards a value of the reference current at the first sampling time; and
apply an output voltage of the uninterruptable power supply to the load.

47. The computer readable medium of claim 46, further comprising instructions that will cause the processor to:
sample a voltage of the capacitor at the first sampling time;
obtain the reference current at the first sampling time based at least in part on the inductor current at the first sampling time and the voltage of the capacitor at the first sampling time.

48. The computer readable medium of claim 47, further comprising instructions that will cause the processor to:
sample a voltage of the capacitor at the second sampling time; and
adjust the duty cycle to drive the voltage of the capacitor at the second sampling time towards a value substantially equal to a reference voltage of the capacitor at the first sampling time.

49. A system for distributing power to a load, the system having an output inverter and a filter, the filter having an inductor and a capacitor, the system comprising:
a processor configured to apply a pulse width modulation control signal to the output inverter;
the processor configured to sample inductor current at a first sampling time at a beginning of one switching cycle and a second sampling time at an end of the one switching cycle, the one switching cycle having a time period extending from the beginning of the one switching cycle to the end of the one switching cycle;
the processor configured to compare the inductor current at the first sampling time with a reference current at the first sampling time;
the processor configured to adjust a duty cycle of the pulse width modulation control signal during the time period to drive the inductor current at the second sampling time towards a value of the reference current at the first sampling time; and
the processor configured to apply an output voltage for the load.

50. The system of claim 49, comprising:
the processor configured to sample a voltage of the capacitor at the first sampling time;
the processor configured to determine the reference current at the first sampling time based at least in part on the inductor current at the first sampling time and the voltage of the capacitor at the first sampling time.

51. The system of claim 49, comprising:
the processor configured to initiate adjustment of the duty cycle at a first time within 10% of a first valley of a carrier signal waveform; and
the processor configured to determine an updated value of the reference current at a second time within 10% of a second valley of the carrier signal waveform.

52. The method of claim 1, wherein the end of the one switching cycle corresponds to a beginning of a next switching cycle of a plurality of switching cycles with each of the plurality of switching cycles having a beginning and an end with the beginning of each of the plurality of switching cycles corresponding to an end of a previous switching cycle of the plurality of switching cycles, and wherein the method further comprises sampling inductor current at the beginning and end of each of the plurality of switching cycles to create a plurality of sample current values, each switching cycle of the plurality of switching cycles having a time period extending from the beginning of the switching cycle to the end of the switching cycle;
comparing each sample current value of the plurality of sample current values with a corresponding reference current value;
adjusting a duty cycle of the pulse width modulation control signal during the time period of each of the plurality of switching cycles to drive the inductor current at the end of each switching cycle of the plurality of switching cycles towards the corresponding reference current value at the beginning of the switching cycle.

53. The uninterruptible power supply of claim 26, wherein the end of the one switching cycle corresponds to a beginning of a next switching cycle of a plurality of switching cycles with each of the plurality of switching cycles having a beginning and an end with the beginning of each of the plurality of switching cycles corresponding to an end of a previous switching cycle of the plurality of switching cycles, the uninterruptible power supply comprising:
the processor configured to sample inductor current at the beginning and end of each of the plurality of switching cycles to create a plurality of sample current values, each switching cycle of the plurality of switching cycles having a time period extending from the beginning of the switching cycle to the end of the switching cycle;
the processor configured to compare each sample current value of the plurality of sample current values with a corresponding reference current value; and
the processor configured to adjust a duty cycle of the pulse width modulation control signal during the time period of each of the plurality of switching cycles to drive the inductor current at the end of each switching cycle of the plurality of switching cycles towards the corresponding reference current value at the beginning of the switching cycle.

54. The uninterruptible power supply of claim 45, wherein the switching cycle time period corresponds to one switching cycle having a beginning and an end, wherein the end of the one switching cycle corresponds to a beginning of a next switching cycle of a plurality of switching cycles with each of the plurality of switching cycles having a beginning and an end with the beginning of each of the plurality of switching cycles corresponding to an end of a previous switching cycle of the plurality of switching cycles, the uninterruptible power supply comprising:
the control module configured to sample inductor current at the beginning and end of each of the plurality of switching cycles to create a plurality of sample current values, each switching cycle of the plurality of switching cycles having a time period extending from the beginning of the switching cycle to the end of the switching cycle;
the control module configured to compare each sample current value of the plurality of sample current values with a corresponding reference current value; and
means for adjusting a duty cycle of the pulse width modulation control signal during the time period of each of the plurality of switching cycles to drive the inductor current at the end of each switching cycle of the plurality of switching cycles towards the corresponding reference current value at the beginning of the switching cycle.

55. The computer readable medium of claim 46, wherein the end of the one switching cycle corresponds to a beginning of a next switching cycle of a plurality of switching cycles with each of the plurality of switching cycles having a beginning and an end with the beginning of each of the plurality of switching cycles corresponding to an end of a previous switching cycle of the plurality of switching cycles, further comprising instructions that will cause the processor to:
  sample inductor current at the beginning and end of each of the plurality of switching cycles to create a plurality of sample current values, each switching cycle of the plurality of switching cycles having a time period extending from the beginning of the switching cycle to the end of the switching cycle;
  compare each sample current value of the plurality of sample current values with a corresponding reference current value; and
  adjust a duty cycle of the pulse width modulation control signal during the time period of each of the plurality of switching cycles to drive the inductor current at the end of each switching cycle of the plurality of switching cycles towards the corresponding reference current value at the beginning of the switching cycle.

56. The system of claim 49, wherein the end of the one switching cycle corresponds to a beginning of a next switching cycle of a plurality of switching cycles with each of the plurality of switching cycles having a beginning and an end with the beginning of each of the plurality of switching cycles corresponding to an end of a previous switching cycle of the plurality of switching cycles, the system comprising:
  the processor configured to sample inductor current at the beginning and end of each of the plurality of switching cycles to create a plurality of sample current values, each switching cycle of the plurality of switching cycles having a time period extending from the beginning of the switching cycle to the end of the switching cycle;
  the processor configured to compare each sample current value of the plurality of sample current values with a corresponding reference current value; and
  the processor configured to adjust a duty cycle of the pulse width modulation control signal during the time period of each of the plurality of switching cycles to drive the inductor current at the end of each switching cycle of the plurality of switching cycles towards the corresponding reference current value at the beginning of the switching cycle.

* * * * *